United States Patent
Sun et al.

(10) Patent No.: US 11,843,504 B2
(45) Date of Patent: Dec. 12, 2023

(54) METHOD AND APPARATUS FOR INDICATING FAULT STATUS

(71) Applicant: HUAWEI TECHNOLOGIES CO., LTD., Guangdong (CN)

(72) Inventors: Desheng Sun, Shenzhen (CN); Li Ding, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 26 days.

(21) Appl. No.: 17/542,353

(22) Filed: Dec. 3, 2021

(65) Prior Publication Data

US 2022/0094591 A1    Mar. 24, 2022

Related U.S. Application Data

(63) Continuation of application No. PCT/CN2020/094203, filed on Jun. 3, 2020.

(30) Foreign Application Priority Data

Jun. 4, 2019 (CN) .......................... 201910480929.1

(51) Int. Cl.
  *H04L 41/0654* (2022.01)
  *H04L 41/0686* (2022.01)
  *H04L 41/0893* (2022.01)

(52) U.S. Cl.
  CPC ...... *H04L 41/0686* (2013.01); *H04L 41/0654* (2013.01); *H04L 41/0893* (2013.01)

(58) Field of Classification Search
  CPC ..... H04L 1/0023; H04L 1/004; H04L 1/0041; H04L 1/0057; H04L 1/0061;
  (Continued)

(56) References Cited

U.S. PATENT DOCUMENTS

2010/0162033 A1    6/2010    Ahn et al.
2014/0078894 A1    3/2014    Han et al.
(Continued)

FOREIGN PATENT DOCUMENTS

CN    106612203 A    5/2017
CN    106612220 A    5/2017
(Continued)

OTHER PUBLICATIONS

Huawei Technologies et al.,"Restructuring G.709.1 clauses",Geneva. Jun. 19-30, 2017,Telecommunication Standardization Sector,Study Period 2017-2020,total:27pages.

(Continued)

*Primary Examiner* — Melvin C Marcelo
*Assistant Examiner* — Natali Pascual Peguero
(74) *Attorney, Agent, or Firm* — Paul Christopher Hashim

(57) ABSTRACT

Method and an apparatus are provided for indicating a fault status. The method includes: a first device determines N alignment marker AM groups, where the N AM groups include first indication information, the first indication information is used to indicate a fault status of R receiving logical lanes of the first device, and each of the N AM groups includes M pieces of alignment marker group lane AMGL information; and in an $i^{th}$ period of N periods, the first device respectively sends M pieces of AMGL information constituting an $i^{th}$ AM group to a second device over M transmitting logical lanes.

20 Claims, 6 Drawing Sheets

(58) Field of Classification Search
CPC ... H04L 1/0067; H04L 1/0071; H04L 1/1607; H04L 1/24; H04L 41/0654; H04L 41/0686; H04L 41/0893; H04L 1/0079
See application file for complete search history.

(56) References Cited

U.S. PATENT DOCUMENTS

| 2017/0272308 A1 | 9/2017 | Stone et al. |
| 2019/0097748 A1 | 3/2019 | Loprieno et al. |
| 2019/0132185 A1 | 5/2019 | Farhoodfar et al. |

FOREIGN PATENT DOCUMENTS

| CN | 108702327 A | 10/2018 |
| EP | 3089423 A1 | 11/2016 |
| WO | 2018227566 A1 | 12/2018 |

OTHER PUBLICATIONS

IEEE Std 802.3—2018, IEEE Standard for Ethernet LAN/MAN Standards Committee of the, IEEE Computer Society, Approved Jun. 14, 2018, total 5600 pages.

| Bit position: | 0 | 23 24 | 31 32 | 55 56 | 63 64 | 87 88 | 95 96 | 119 |
|---|---|---|---|---|---|---|---|---|
| | {$CM_0, CM_1, CM_2$} | $UP_0$ | {$CM_3, CM_4, CM_5$} | $UP_1$ | {$UM_0, UM_1, UM_2$} | $UP_2$ | {$UM_3, UM_4, UM_5$} | |

FIG. 3

| Bit position: | 0 1 | 2      9 | 10     17 | 18     25 | 26     33 | 34     41 | 42     49 | 50     57 | 58     65 |
|---|---|---|---|---|---|---|---|---|---|
| | 10 | $M_0$ | $M_1$ | $M_2$ | $BIP_3$ | $M_4$ | $M_5$ | $M_6$ | $BIP_7$ |

METHOD AND APPARATUS FOR INDICATING FAULT STATUS

CROSS-REFERENCE TO RELATED APPLICATIONS

This application is a continuation of International Application No. PCT/CN2020/094203, filed on Jun. 3, 2020, which claims priority to Chinese Patent Application No. 201910480929.1, filed on Jun. 4, 2019. The disclosures of the aforementioned applications are hereby incorporated by reference in their entireties.

TECHNICAL FIELD

This application relates to the communications field, and more specifically, to a method and an apparatus for indicating a fault status in the communications field.

BACKGROUND

With the rapid development of network technologies, requirements for data transmission rates and transmission quality become increasingly high. In Ethernet, multi-lane distribution (MLD) is usually used to implement higher-rate and higher-quality transmission. However, it is possible that during multi-lane data transmission, some faulty lanes may cause all lanes to be unavailable. Consequently, utilization of the lanes is reduced. To improve the utilization of the lanes, it is necessary to isolate the faulty lanes and continue to transmit data over the remaining lanes. Generally, only a receiver end of a lane can detect an alarm. Therefore, a transmitter end needs to know which lanes of the receiver end are faulty, and to work with the receiver end to isolate the faulty lanes, so as to ensure normal transmission of the remaining lanes. Therefore, a method allowing a transmitter end to know or otherwise be aware of a lane fault status is urgently needed to improve utilization of lanes.

SUMMARY

This application provides a method and an apparatus for indicating a fault status to improve utilization of lanes.

According to a first aspect, a method for indicating a fault status is provided, including: determining, by a first device, N alignment marker (AM) groups, where the N AM groups include first indication information, the first indication information is used to indicate a fault status of R receiving logical lanes of the first device, and each of the N AM groups includes M pieces of alignment marker group lane (AMGL) information; and in an $i^{th}$ period of N periods, respectively sending, by the first device, M pieces of AMGL information constituting an $i^{th}$ AM group to a second device over M transmitting logical lanes, where the N periods are in a one-to-one correspondence with the N AM groups, and the N AM groups are used for the second device to align data sent by the first device over the M transmitting logical lanes in the N periods, where M, N, and R are positive integers, and i is a positive integer greater than 0 and less than or equal to N.

Therefore, in this embodiment of this application, the fault status of the receiving logical lanes of the first device is indicated by using the first indication information in the AM group, so that the second device knows the fault status of the receiving logical lanes of the first device, which helps the second device process, for example, isolate or disconnect, a transmitting logical lane corresponding to a faulty receiving logical lane of the first device. In this way, the first device and the second device can continue sending and receiving data over the remaining non-faulty logical lanes, so as to improve utilization of the logical lanes. Further, the fault status of the receiving logical lanes of the first device is indicated by using the first indication information in the AM group, so that extra signaling overheads can be avoided while maintaining compatibility with an existing protocol.

One piece of alignment marker group lane (AMGL) information is sent over one of the M transmitting logical lanes, that is, the M transmitting logical lanes are in a one-to-one correspondence with the M pieces of AMGL information. The M transmitting logical lanes may be effective non-faulty transmitting logical lanes.

One AM group may be sent over the M transmitting logical lanes in one period, and the N AM groups may be sent in the N periods. When N=1, first indication information included in one AM group sent in one period may indicate the fault status of the R receiving logical lanes of the first device. When N is greater than 1, first indication information included in a plurality of AM groups sent in a plurality of periods may indicate the fault status of the R receiving logical lanes of the first device, that is, the plurality of AM groups include one piece of first indication information in total.

In some possible implementations, a form of the first indication information is not limited at all. In other words, the first indication information carried in the N AM groups may be a value obtained without performing any operation based on a value indicating the fault status of the R receiving logical lanes, or may be a value obtained after some operations are performed. For example, the operation may be an XOR operation, or a scrambling operation, or the like.

In some possible implementations, a relationship between values of R and M is not limited, and R may be greater than, or less than, or equal to M.

In some possible implementations, the fault status may indicate that there is a fault or no fault. In other words, the first indication information is used to indicate which of the R receiving logical lanes of the first device is faulty and which of the R receiving logical lanes is not faulty. Optionally, none of the R receiving logical lanes are faulty; or all of the R receiving logical lanes are faulty; or some of the R receiving logical lanes are faulty, while the other logical lanes are not faulty.

In some possible implementations, each of the N AM groups may consist of an integer quantity of code blocks, each code block has a same size, and each AM group has different compositions depending on Ethernet speeds. For example, for a 200G Ethernet interface, an AM group specified by IEEE 802.3 includes four 257-bit code blocks. For another example, for a 400G Ethernet interface, an AM group specified by IEEE 802.3 includes eight 257-bit code blocks. For still another example, for an Ethernet interface of another speed, an AM group includes a plurality of code blocks of a plurality of bits, and a composition of the AM group is specifically determined as required.

In some possible implementations, each of the N AM groups may include an integer quantity of code blocks, each code block has a same size, and each AM group includes a different quantity of code blocks under different circumstances. In other words, code blocks included in each AM group are related to a quantity of currently effective transmitting logical lanes. For example, for a 200G Ethernet speed, when none of the eight transmitting logical lanes are faulty, an AM group includes four 257-bit code blocks (in this case, M=8); when three of the eight transmitting logical lanes are faulty, there are only five effective logical lanes, and in this case, an AM group includes AMs for five transmitting logical lanes, and a quantity of 257-bit code blocks in the AM group may be reduced to 3 (in this case, M=5).

In some possible implementations, first AMGL information in the M pieces of AMGL information includes a first alignment marker AM, second AMGL information in the M pieces of AMGL information includes a second AM and a padding bit, third AMGL information in the M pieces of AMGL information includes a third AM, a padding bit, and a status field bit, and the first AM, the second AM, and the third AM each include a unique padding bit. That is, some AMGL information in the M pieces of AMGL information includes only an AM, some AMGL information includes both an AM and a padding bit, and some AMGL information includes an AM, a padding bit, and a status field bit. In other words, in one period, only an AM is sent over some of the M transmitting logical lanes, both an AM and a padding bit are sent over some of the transmitting logical lanes, and an AM, a padding bit, and a status field bit are sent over some of the transmitting logical lanes. For example, for the 200G or 400G Ethernet interface, only an AM is sent over some of the 8 or 16 transmitting logical lanes, both an AM and a padding bit are sent over some of the transmitting logical lanes, and an AM, a padding bit, and a status field bit are sent over some of the transmitting logical lanes.

In some possible implementations, first AMGL information in the M pieces of AMGL information includes a fourth AM, and second AMGL information in the M pieces of AMGL information includes a fifth AM and a padding bit. That is, some AMGL information in the M pieces of AMGL information includes only an AM, and some AMGL information includes both an AM and a padding bit. In other words, in one period, only an AM is sent over some of the M transmitting logical lanes, and both an AM and a padding bit are sent over some of the transmitting logical lanes. For example, for a 100G Ethernet interface, only an AM is sent over some of the four transmitting logical lanes, and both an AM and a padding bit are sent over some of the transmitting logical lanes.

In some possible implementations, one AM group includes at least one of the first AMGL information, the second AMGL information, and the third AMGL information.

In some possible implementations, Q pieces of AMGL information in the M pieces of AMGL information constituting each of the N AM groups include the first indication information, where L·R=N·P·Q, P is a quantity of bits of each of the Q pieces of AMGL information occupied by the first indication information, and L, P, and Q are positive integers.

In some possible implementations, before the respectively sending, by the first device, M pieces of AMGL information constituting an $i^{th}$ AM group to a second device over M transmitting logical lanes, the method further includes: respectively sending, by the first device, M pieces of AMGL information constituting a first AM group to the second device over the M transmitting logical lanes, where the first AM group includes second indication information, the second indication information is used to indicate that the N AM groups include the first indication information, the first indication information is carried in a first bit field of the Q pieces of AMGL information, and the second indication information is carried in the first bit field of at least some of the M pieces of AMGL information constituting the first AM group.

In some possible implementations, L=1, P=1, Q=1, and the first indication information is carried in a reserved bit of a status field of the Q pieces of AMGL information. For example, N=4, and R=4. For another example, N=8, and R=8. For still another example, N=16, and R=16.

In some possible implementations, L=1, N=1, Q=1, and the first indication information is carried in a padding bit of the Q pieces of AMGL information. For example, P=4, and R=4. For another example, P=8, and R=8. For still another example, P=16, and R=16.

In some possible implementations, N=1, P=R, and the first indication information is carried in a padding bit of each of the Q pieces of AMGL information. For example, P=8, Q=8, and L=8. For another example, P=16, Q=16, and L=16.

In some possible implementations, R=N·P, and the first indication information is carried in a padding bit of each of the Q pieces of AMGL information. For example, L=16, Q=16, R=16, N=8, and P=2. For another example, L=8, Q=8, R=8, N=4, and P=2.

In some possible implementations, the padding bit is a unique padding bit.

In some possible implementations, the respectively sending, by the first device, M pieces of AMGL information constituting an $i^{th}$ AM group to a second device over M transmitting logical lanes includes: distributing, by the first device, the M pieces of AMGL information constituting the $i^{th}$ AM group to the M transmitting logical lanes; and sending, by the first device, the M pieces of AMGL information constituting the $i^{th}$ AM group to receiving physical lanes of the second device over transmitting physical lanes corresponding to the M transmitting logical lanes.

In some possible implementations, the M transmitting logical lanes and the R receiving logical lanes are physical coding sublayer lanes PCSLs or forward error correction lanes FECLs.

According to a second aspect, a method for indicating a fault status is provided, including: in an $i^{th}$ period of N periods, receiving, by a second device, M pieces of AMGL information constituting an $i^{th}$ AM group and sent by a first device over M transmitting logical lanes, where N AM groups corresponding to the N periods include first indication information, the first indication information is used to indicate a fault status of R receiving logical lanes of the first device, each of the N AM groups includes M pieces of alignment marker group lane AMGL information, and the N AM groups are used for the second device to align data sent by the first device over the M transmitting logical lanes in the N periods; and determining, by the second device, a faulty receiving logical lane from the R receiving logical lanes based on the first indication information, where M, N, and R are positive integers, and i is a positive integer greater than 0 and less than or equal to N.

In some possible implementations, Q pieces of AMGL information in the M pieces of AMGL information constituting each of the N AM groups include the first indication information, where L·R=N·P·Q, P is a quantity of bits of each of the Q pieces of AMGL information occupied by the first indication information, and L, P, and Q are positive integers.

In some possible implementations, before the receiving, by a second device, M pieces of AMGL information constituting an $i^{th}$ AM group and sent by a first device over M transmitting logical lanes, the method further includes:

receiving, by the second device, M pieces of AMGL information constituting a first AM group and respectively sent by the first device over the M transmitting logical lanes, where the first AM group includes second indication information, the second indication information is used to indicate that the N AM groups include the first indication information, the first indication information is carried in a first bit field of the Q pieces of AMGL information, and the second indication information is carried in the first bit field of at least some of the M pieces of AMGL information constituting the first AM group, where the receiving, by a second device, M pieces of AMGL information constituting an $i^{th}$ AM group and sent by a first device over M transmitting logical lanes includes: receiving, by the second device based on the second indication information, the M pieces of AMGL information constituting the $i^{th}$ AM group and sent by the first device over the M transmitting logical lanes.

In some possible implementations, L=1, P=1, Q=1, and the first indication information is carried in a reserved bit of a status field of the Q pieces of AMGL information, where the determining, by the second device, a faulty receiving logical lane from the R receiving logical lanes based on the first indication information includes: determining, by the second device, the faulty receiving logical lane from the R receiving logical lanes based on the first indication information carried in the reserved bit of the status field of the Q pieces of AMGL information.

In some possible implementations, L=1, N=1, Q=1, and the first indication information is carried in a padding bit of the Q pieces of AMGL information, where the determining, by the second device, a faulty receiving logical lane from the R receiving logical lanes based on the first indication information includes:

determining, by the second device, the faulty receiving logical lane from the R receiving logical lanes based on the first indication information carried in the padding bit of the Q pieces of AMGL information.

In some possible implementations, N=1, P=R, and the first indication information is carried in a padding bit of each of the Q pieces of AMGL information, where the determining, by the second device, a faulty receiving logical lane from the R receiving logical lanes based on the first indication information includes: determining, by the second device, the faulty receiving logical lane from the R receiving logical lanes based on the first indication information carried in the padding bit of each of the Q pieces of AMGL information.

In some possible implementations, R=N·P, and the first indication information is carried in a padding bit of each of the Q pieces of AMGL information, where the determining, by the second device, a faulty receiving logical lane from the R receiving logical lanes based on the first indication information includes:

determining, by the second device, the faulty receiving logical lane from the R receiving logical lanes based on the first indication information carried in the padding bit of each of the Q pieces of AMGL information.

In some possible implementations, the padding bit is a unique padding bit.

In some possible implementations, the receiving, by a second device, M pieces of AMGL information constituting an $i^{th}$ AM group and sent by a first device over M transmitting logical lanes includes:

receiving, by the second device over receiving physical lanes, the M pieces of AMGL information constituting the $i^{th}$ AM group and sent by the first device over physical lanes corresponding to the M transmitting logical lanes; and distributing, by the second device, the M pieces of AMGL information of the $i^{th}$ AM group to the M receiving logical lanes of the second device.

In some possible implementations, the M transmitting logical lanes of the first device, the R receiving logical lanes of the first device, and the M receiving logical lanes of the second device are physical coding sublayer lanes PCSLs or forward error correction lanes FECLs.

In some possible implementations, first AMGL information in the M pieces of AMGL information includes a first alignment marker AM, second AMGL information in the M pieces of AMGL information includes a second AM and a padding bit, third AMGL information in the M pieces of AMGL information includes a third AM, a padding bit, and a status field bit, and the first AM, the second AM, and the third AM each include a unique padding bit; or first AMGL information in the M pieces of AMGL information includes a fourth AM, and second AMGL information in the M pieces of AMGL information includes a fifth AM and a padding bit.

According to a third aspect, this application provides an apparatus for indicating a fault status, configured to implement the method according to the first aspect and/or any one of the possible implementations of the first aspect. The apparatus may be a network device, may be an apparatus in a network device, or may be an apparatus that can be used together with a network device. In a design, the apparatus may include a module corresponding to performing the method/operation/step/action described in the first aspect and/or any one of the possible implementations of the first aspect. The module may be a hardware circuit, may be software, or may be implemented by a hardware circuit in combination with software. In a design, the apparatus may include a processing unit and a transceiver unit.

According to a fourth aspect, this application provides an apparatus for indicating a fault status, configured to implement the method according to the second aspect and/or any one of the possible implementations of the second aspect. The apparatus may be a network device, may be an apparatus in a network device, or may be an apparatus that can be used together with a network device. In a design, the apparatus may include a module corresponding to performing the method/operation/step/action described in the second aspect and/or any one of the possible implementations of the second aspect. The module may be a hardware circuit, may be software, or may be implemented by a hardware circuit in combination with software. In a design, the apparatus may include a processing unit and a transceiver unit.

According to a fifth aspect, this application provides an apparatus for indicating a fault status. The apparatus includes a processor, configured to implement the method described in the first aspect and/or any one of the possible implementations of the first aspect. The apparatus may further include a memory. Optionally, the memory is configured to store instructions. When executing the instructions stored in the memory, the processor may implement the method described in the first aspect and/or any one of the possible implementations of the first aspect. The apparatus may further include a communications interface. The communications interface is used by the apparatus to communicate with another device. For example, the communications interface may be a transceiver, a circuit, a bus, a module, a pin, or another type of communications interface.

According to a sixth aspect, this application provides an apparatus for indicating a fault status. The apparatus includes a processor, configured to implement the method described in the second aspect and/or any one of the possible implementations of the second aspect. The apparatus may further include a memory. Optionally, the memory is configured to store instructions. When executing the instructions stored in the memory, the processor may implement the method described in the second aspect and/or any one of the possible implementations of the second aspect. The apparatus may further include a communications interface, and the communications interface is used by the apparatus to communicate with another device.

According to a seventh aspect, this application provides an apparatus for indicating a fault status, where the system includes the apparatus provided in the third aspect and the apparatus provided in the fourth aspect.

Alternatively, the system includes the apparatus provided in the fifth aspect and the apparatus provided in the sixth aspect.

According to an eighth aspect, this application provides a computer-readable storage medium. The computer-readable storage medium stores computer instructions. When the computer instructions are run on a computer, the computer is enabled to perform the method in the foregoing aspects and any one of the possible designs of the foregoing aspects.

According to a ninth aspect, this application provides a chip, including a processor. The processor is configured to perform the method in the foregoing aspects and any one of the possible implementations of the foregoing aspects.

Optionally, the chip further includes a memory, and the memory is coupled to the processor.

Further, optionally, the chip further includes a communications interface.

According to a tenth aspect, this application provides a computer program product. The computer program product includes computer program code; and when the computer program code is run on a computer, the computer is enabled to perform the method in the foregoing aspects and any one of the possible designs of the foregoing aspects.

BRIEF DESCRIPTION OF DRAWINGS

FIG. 3 is a schematic diagram of an AM format of a 200G or 400G Ethernet technology according to an embodiment of this application;

DETAILED DESCRIPTION OF EMBODIMENTS

Figure 1:
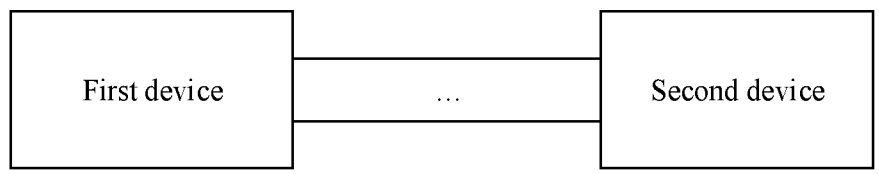
FIG. 1 is a schematic diagram of a system architecture according to an embodiment of this application.

With the development of networks, requirements for network traffic are increasingly high. For example, there are currently 100G (100,000 megabits per second), 200G (200,000 megabits per second), and 400G (400,000 megabits per second) Ethernet technologies. The development of networks requires higher Ethernet speeds. In a schematic diagram of a system architecture shown in FIG. 1, a first device and a second device are connected by a plurality of physical lanes, and the plurality of physical lanes for parallel transmission can improve the speed of Ethernet. For example, a physical lane may be a high-speed bus, for example, a physical medium such as a copper wire or an optical fiber. In this way, the first device and the second device may be electrically interconnected by copper wires. For example, for the 200G Ethernet technology, the first device and the second device may be connected by eight physical lanes, or four physical lanes, or two physical lanes, or one physical lane. For another example, for the 400G Ethernet technology, the first device and the second device may be connected by 16 physical lanes, or eight physical lanes, or four physical lanes, or two physical lanes, or one physical lane. For still another example, for the 100G Ethernet technology, the first device and the second device are connected by four physical lanes, or two physical lanes, or one physical lane.

The first device and the second device may be chips, or may be units or physical devices having receiving and sending functions. If the first device sends data, the second device receives data. If the second device sends data, the first device receives data. Transmitting physical lanes of the first device are in a one-to-one correspondence with receiving physical lanes of the second device. Transmitting physical lanes of the second device are in a one-to-one correspondence with receiving physical lanes of the first device. An example in which the first device is a transmitter end and the second device is a receiver end is used for description in the following.

Figure 2:
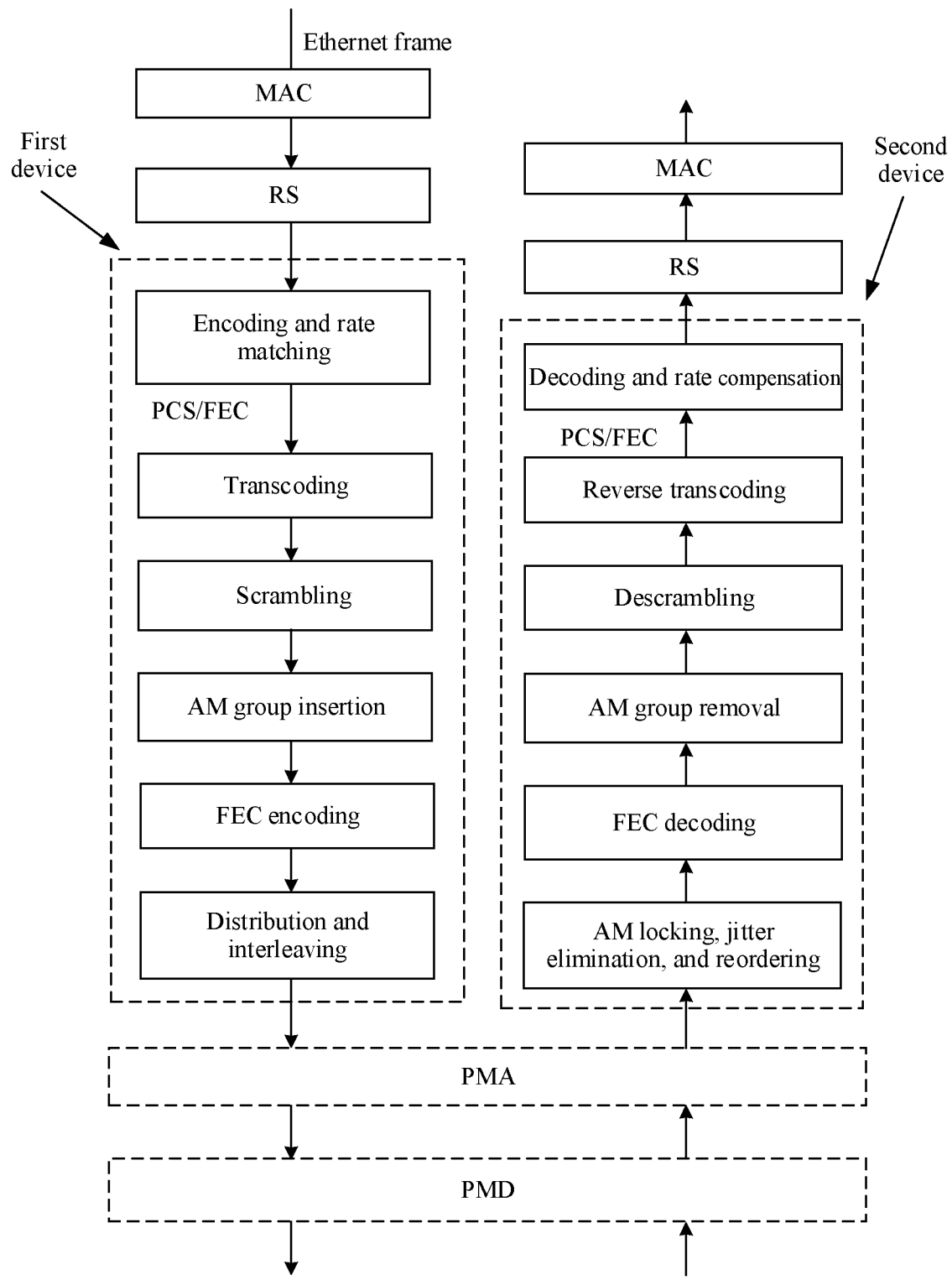
FIG. 2 is a schematic diagram of a processing process of a physical layer according to an embodiment of this application.

In an Ethernet technology, data processing mainly includes data link layer processing and physical layer processing, and the embodiments of this application relate to physical layer processing. With reference to FIG. 2, the following describes a schematic diagram of a processing process of a physical layer according to an embodiment of this application. As shown in FIG. 2, a first device receives an Ethernet frame from a data link layer; when the Ethernet frame enters a media access control (MAC) layer and a reconciliation sublayer (RS), the MAC layer performs checking on the Ethernet frame; and bits after the checking are sent to a physical coding sublayer (physical coding sublayer, PCS) via the RS sublayer through some kind of generic medium independent interface (xMII). The PCS sublayer receives relevant bits from the xMII, and performs encoding and rate matching based on a specific bit block of a first size. After the encoding and rate matching, a code block stream of bit blocks of the first size are further encoded into a serial code block stream of bit blocks of a second size according to an encoding rule. After the serial code block stream of the bit blocks of the second size is scrambled, an alignment marker (AM) group is inserted into the serial code block stream. The AM group is also a plurality of bit blocks of the second size. After the insertion of the AM group, forward error correction (FEC) encoding is performed on the plurality of serial bit blocks of the second size, and check bits are added. Then, a code block stream of the bit blocks of the second size are distributed to a plurality of physical coding sublayer lanes (PCSLs) or forward error correction lanes (FECLs) according to a specific quantity of bits by means of distribution and interleaving. Each piece of AMGL information in the AM group is distributed on each PCSL or FECL. The bits on the PCSLs or FECLs may be sent to a second device via a physical medium attachment (PMA) sublayer and a physical medium dependent (PMD) sublayer. The second device receives, via PMD and PMA, the bits sent by the first device, uses the AMGL on each PCSL or FECL to lock and then align the lanes. After the alignment, the lanes are reordered, and then data on the reordered lanes is sequentially extracted, so as to obtain a serial bit stream. After FEC decoding is performed on the serial bit stream, a serial code block stream of bit blocks of the second size is formed. The AM group in the serial code block stream is removed. After descrambling and reverse transcoding are performed on the serial code block stream from which the AM group is removed, a serial code block stream of bit blocks of the first size is obtained. After decoding and rate compensation are performed on the serial code block stream of the bit blocks of the first size, data is sent to an RS sublayer and a MAC layer, and the data is transferred to a data link layer via the MAC layer.

In the description of FIG. 2, the bit block of the first size and the bit block of the second size vary depending on Ethernet technologies. For example, for 200G or 400G, the bit block of the first size is 64-bit (B)/66B, the bit block of the second size is 256B/257B, and the AM group includes four or eight 257B code blocks. For 100G, the bit block of the first size is 64B/66B, the bit block of the second size is 256B/257B, and the AM group includes five 257B code blocks.

It should be noted that, for ease of understanding, FIG. 2 merely provides a brief description of processing procedures of an Ethernet interface. In specific application, other processing processes may be added, or the foregoing processing process may not be included. For example, for a 40G and 100G Ethernet interfaces, the processes of 256B/257B transcoding, FEC encoding, and FEC decoding may not be included. The processing processes vary depending on Ethernet technologies. For example, for the 200G and 400G Ethernet technologies, the processes of FEC encoding and FEC decoding may be included, and FEC is in the PCS sublayer. For the 40G and 100G Ethernet technologies, the processes of 256B/257B transcoding, FEC encoding, and FEC decoding may or may not be included. When the processes of 256B/257B transcoding, FEC encoding, and FEC decoding may be included for the 40G and 100G Ethernet technologies, the FEC sublayer is located between the PCS and PMA sublayers as an independent sublayer.

The following briefly describes terms used in the embodiments of this application.

AM group: The AM group may be a plurality of 257B code blocks. One AM group includes M pieces of AMGL information, one piece of AMGL information may be sent over one transmitting logical lane, and M pieces of AMGL information may be sent over M transmitting logical lanes. For example, for the 200G Ethernet technology, the AM group is four 257B code blocks, and the four 257B code blocks consist of eight 120 bits, a 65-bit padding field, and a 3-bit status field (4*257=120*8+65+3), where the 3-bit status field includes one reserved bit. For another example, for the 400G Ethernet technology, the AM group is eight 257B code blocks, and the eight 257B code blocks consist of sixteen 120 bits, 133 padding bits, and a 3-bit status field (8*257=120*16+133+3), where the 3-bit status field includes one reserved bit. For still another example, for the 100G Ethernet technology, the AM group is five 257B code blocks, and the five 257B code blocks consist of twenty 64 bits and five padding bits (5*257=20*64+5).

For the 200G and 400G Ethernet technologies, the plurality of 257B code blocks of the AM group are distributed to a plurality of logical lanes according to symbols (10 bits). For example, for a 200G Ethernet interface, the four 257B code blocks of the AM group consist of eight 120 bits, 65 padding bits, and a 3-bit status field (4*257=120*8+65+3). As shown in Table 1, $a_i$ denotes a symbol (10 bits). The first 10 bits ($a_0$) of the eight 120 bits are distributed to a transmitting logical lane with lane index 0, and the second 10 bits ($a_1$) are distributed to a transmitting logical lane with lane index 1. By analogy, the eighth 10 bits ($a_7$) are distributed to a transmitting logical lane with lane index 7, and the ninth 10 bits ($a_8$) are distributed to a transmitting logical lane with lane index 0. By analogy, the eight 120 bits ($a_0, \ldots, a_{95}$) are distributed to the first 12 symbols of each transmitting logical lane. Then, the first 10 bits ($a_{96}$) of the 65 padding bits are distributed to the transmitting logical lane with lane index 0, the second 10 bits ($a_{97}$) are distributed to the transmitting logical lane with lane index 1, the third 10 bits ($a_{98}$) are distributed to a transmitting logical lane with lane index 2, the fourth 10 bits ($a_{99}$) are distributed to a transmitting logical lane with lane index 3, the fifth 10 bits ($a_{100}$) are distributed to a transmitting logical lane with lane index 4, and the sixth 10 bits ($a_{101}$) are distributed to a transmitting logical lane with lane index 5. In this way, 60 bits of the 65 padding bits have been distributed to the first six lanes. The remaining five padding bits and the 3-bit status field are distributed to a transmitting logical lane with lane index 6, that is, $a_{102}$ includes the five padding bits and the 3-bit status field. That is, $a_0, a_8, \ldots, a_{88}, a_{96}$ are sent over the transmitting logical lane with lane index 0, and $a_0, a_8, \ldots, a_{88}, a_{96}$ may be referred to as a piece of AMGL information, where $a_0, a_8, \ldots, a_{88}$ may be referred to as an AM, and $a_{96}$ is padding bits. $a_1, a_9, \ldots, a_{89}, a_{97}$ are sent over the transmitting logical lane with lane index 1, and $a_1, a_9, \ldots, a_{89}, a_{97}$ may be referred to as a piece of AMGL information, where $a_1, a_9, \ldots, a_{89}$ may be referred to as an AM, and $a_{97}$ is padding bits. $a_2, a_{10}, \ldots, a_{90}, a_{98}$ are sent over the transmitting logical lane with lane index 2, and $a_2, a_{10}, \ldots, a_{90}, a_{98}$ may be referred to as a piece of AMGL information, where $a_2, a_{10}, \ldots, a_{90}$ may be referred to as an AM, and $a_{98}$ is padding bits. $a_3, a_1, \ldots, a_{91}, a_{99}$ are sent over the transmitting logical lane with lane index 3, and $a_3, a_{11}, \ldots, a_{91}, a_{99}$ may be referred to as a piece of AMGL information, where $a_3, a_{11}, \ldots, a_{91}$ may be referred to as an AM, and $a_{99}$ is padding bits. $a_4, a_{12}, \ldots, a_{92}, a_{100}$ are sent over the transmitting logical lane with lane index 4, and $a_4, a_{12}, \ldots, a_{92}, a_{100}$ may be referred to as a piece of AMGL information, where $a_4, a_{12}, \ldots, a_{92}$ may be referred to as an AM, and $a_{100}$ is padding bits. $a_5, a_{13}, \ldots, a_{93}, a_{101}$ are sent over the transmitting logical lane with lane index 5, and $a_5, a_{13}, \ldots, a_{93}, a_{101}$ may be referred to as a piece of AMGL information, where $a_5, a_{13}, \ldots, a_{93}$ may be referred to as an AM, and $a_{101}$ is padding bits. $a_6, a_{14}, \ldots, a_{94}, a_{102}$ are sent over the transmitting logical lane with lane index 6, and $a_6, a_{14}, \ldots, a_{94}, a_{102}$ may be referred to as a piece of AMGL information, where $a_6, a_{14}, \ldots, a_{94}$ may be referred to as an AM, and $a_{102}$ includes five padding bits and the 3-bit status field, that is, 8 bits in total. $a_7, a_{15}, \ldots, a_{95}$ are sent over the transmitting logical lane with lane index 7, and $a_7, a_{15}, \ldots, a_{95}$ may be referred to as a piece of AMGL information, and the AMGL information includes only an AM, that is, $a_7, a_{15}, \ldots, a_{95}$.

TABLE 1

| Lane index | Symbol index | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 |
| 0 | $a_0$ | $a_8$ | | | | ... | | | | | | $a_{88}$ | $a_{96}$ |
| 1 | $a_1$ | $a_9$ | | | | ... | | | | | | $a_{89}$ | $a_{97}$ |
| 2 | $a_2$ | $a_{10}$ | | | | ... | | | | | | $a_{90}$ | $a_{98}$ |
| 3 | $a_3$ | $a_{11}$ | | | | ... | | | | | | $a_{91}$ | $a_{99}$ |
| 4 | $a_4$ | $a_{12}$ | | | | ... | | | | | | $a_{92}$ | $a_{100}$ |
| 5 | $a_5$ | $a_{13}$ | | | | ... | | | | | | $a_{93}$ | $a_{101}$ |
| 6 | $a_6$ | $a_{14}$ | | | | ... | | | | | | $a_{94}$ | $a_{102}$ |
| 7 | $a_7$ | $a_{15}$ | | | | ... | | | | | | $a_{95}$ | |

Figures 4, 5:
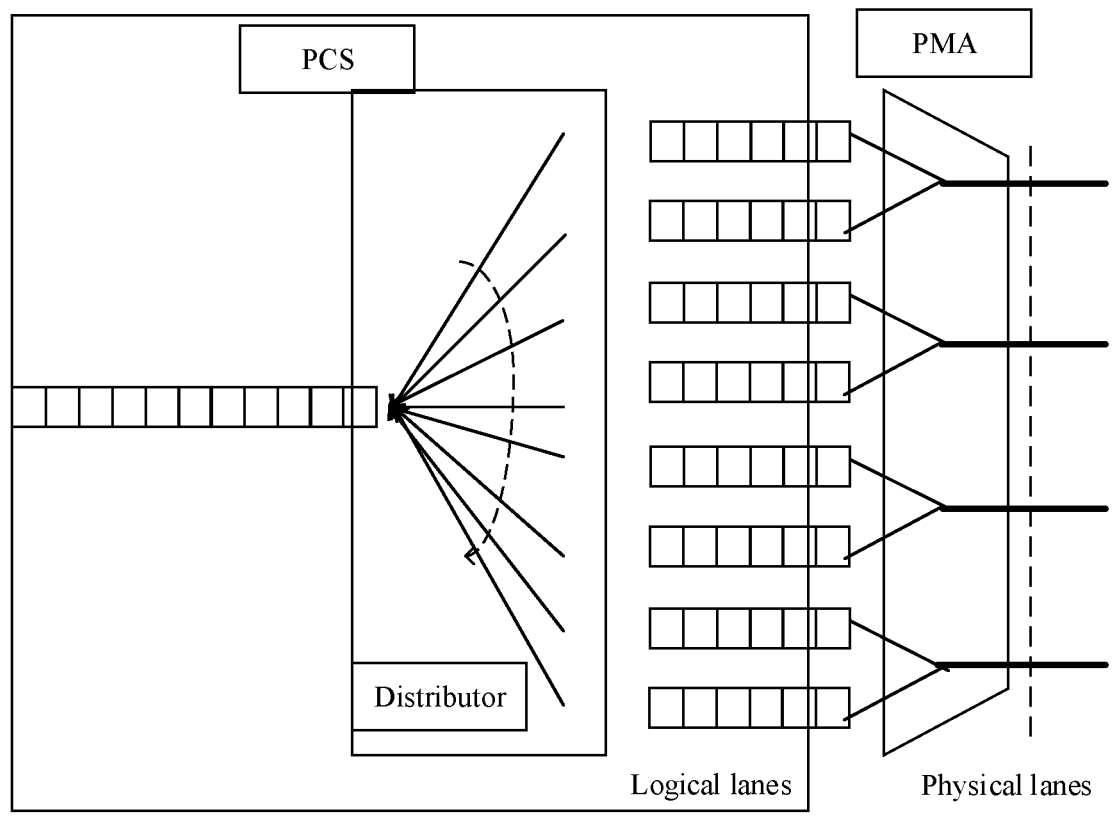
FIG. 4 is a schematic diagram of an AM format of a 100G Ethernet technology according to an embodiment of this application.
FIG. 5 is a schematic diagram of a physical lane and a logical lane according to an embodiment of this application.

AMGL information sent over each transmitting logical lane includes an AM. For the 200G and 400G Ethernet technologies, a format of an AM is shown in FIG. 3, where CM in $CM_0$, $CM_1$, $CM_2$, $CM_3$, $CM_4$, and $CM_5$ represents a common marker (common marker); UM in $UM_0$, $UM_1$, $UM_2$, $UM_3$, $UM_4$, and $UM_5$ represents a unique marker (unique marker); and UP in $UP_0$, $UP_1$, and $UP_2$ represents unique padding (unique padding), where $UP_0$, $UP_1$, and $UP_2$ carry unique padding bits and occupy 8 bits each. $CM_0$, $CM_1$, $CM_2$, $CM_3$, $CM_4$ and $CM_5$ are the same in an AM in each transmitting logical lane. $UM_0$, $UM_1$, $UM_2$, $UM_3$, $UM_4$ and $UM_5$, and $UP_0$, $UP_1$, and $UP_2$ of any two transmitting logical lanes are different. $UM_0$, $UM_1$, $UM_2$, $UM_3$, $UM_4$ and $UM_5$ are used to uniquely identify an AM. For the 100G and 40G Ethernet technologies, a format of an AM is shown in FIG. 4, where M in $M_0$, $M_1$, $M_2$, $M_4$, $M_5$, and $M_6$ represents a marker (marker), BIP in $BIP_3$ and $BIP_7$ represents bit-interleaved parity, and $BIP_3$ or $BIP_7$ may also be a padding field.

A form of an AM for an Ethernet technology of another speed is similar to the form of the AM for the 200G and 400G Ethernet technologies, or may be changed based on the form of the AM for the 200G and 400G Ethernet technologies. To avoid repetition, examples are not listed one by one herein.

A form of an AM group for the 100G Ethernet technology is similar to the form of the AM group for the 200G and 400G Ethernet technologies. A difference lies in that for the 100G Ethernet technology, the AM group is five 257Bs, and the five 257Bs consist of twenty 64 bits and five padding bits (5*257=20*64+5). That is, in the 100G Ethernet technology, AMGL information distributed to a transmitting logical lane does not include a status field. In other words, some AMGL information distributed to a transmitting logical lane includes an AM, and some AMGL information distributed to a transmitting logical lane includes an AM and padding bits. For the 100G Ethernet technology, if the processes of FEC encoding and FEC decoding are not included, AMGL information is distributed to each transmitting logical lane according to 64B.

A form of an AM group for an Ethernet technology of another speed is similar to the form of the AM group for the 200G and 400G Ethernet technologies, or may be changed based on the form of the AM group for the 200G and 400G Ethernet technologies. To avoid repetition, examples are not listed one by one herein.

Logical lane: The logical lane in this application may be a physical coding sublayer lane (PCSL), or a forward error correction lane (FECL). For example, for 200G and 400G Ethernet interfaces, a logical lane may be referred to as a PCSL or a FECL. For another example, for a 100G Ethernet interface (without FEC), a logical lane may be referred to as a PCSL; and for a 100G Ethernet interface (with FEC), the logical lane may be referred to as a FECL.

Physical lane: The physical lane and the logical lane are connected by using an electrical bus. The physical lane may be a high-speed bus.

A correspondence between a physical lane and a logical lane of each of the first device and the second device may be that a logical lanes correspond to b physical lanes, where a=b*c, and a, b, and c are positive integers. c logical lanes correspond to one physical lane, and a distributor of the first device distributes a code block stream to the logical lanes according to symbols. If one or more logical lanes correspond to one physical lane, data on the logical lanes may be sent to the corresponding physical lane. The second device receives, over b physical lanes, data sent over b physical lanes of the first device, and then a receiver distributes data on one physical lane to the c logical lanes. For example, as shown in FIG. 5, for a 200G Ethernet interface, there may be eight parallel logical lanes, and bits on two logical lanes may be distributed to one physical lane. Each logical lane transmits 25G payload data, two logical lanes correspond to one physical lane, and one physical lane transmits 50G payload data.

Transmitting logical lane and receiving logical lane: If the first device has d transmitting logical lanes and d receiving logical lanes, the second device has d receiving logical lanes and d transmitting logical lanes. Data on the d transmitting logical lanes of the first device is sent to the d receiving logical lanes of the second device, and data on the d transmitting logical lanes of the second device is sent to the d receiving logical lanes of the first device. In other words, each device has a same quantity of receiving and transmitting logical lanes, and a transmitting device has a same quantity of receiving and transmitting logical lanes as a receiving device. For example, if the first device has four transmitting logical lanes, the first device has four receiving logical lanes; and if the second device has four receiving logical lanes, the second device has four transmitting logical lanes.

In an existing Ethernet technology, if some receiving logical lanes at a transmitter end or a receiver end are faulty, data cannot be transmitted over an entire link between the receiver end and the transmitter end, which greatly reduces utilization of logical lanes. Therefore, it is necessary for the receiver end and the transmitter end to isolate faulty receiving and transmitting logical lanes and continue using non-faulty receiving and transmitting logical lanes to transmit data. In view of this, according to the embodiments of this application, when detecting a lane fault, the receiver end may use an AM group to carry first indication information during transmission, to indicate a fault status of the receiving logical lanes of the receiver end to a peer end. In this way, the receiver end and transmitter end can isolate or disconnect a faulty logical lane, so that the utilization of the lanes can be improved.

An example in which the transmitter end is a first device and the receiver end is a second device is used for description in the following.

Figure 6:
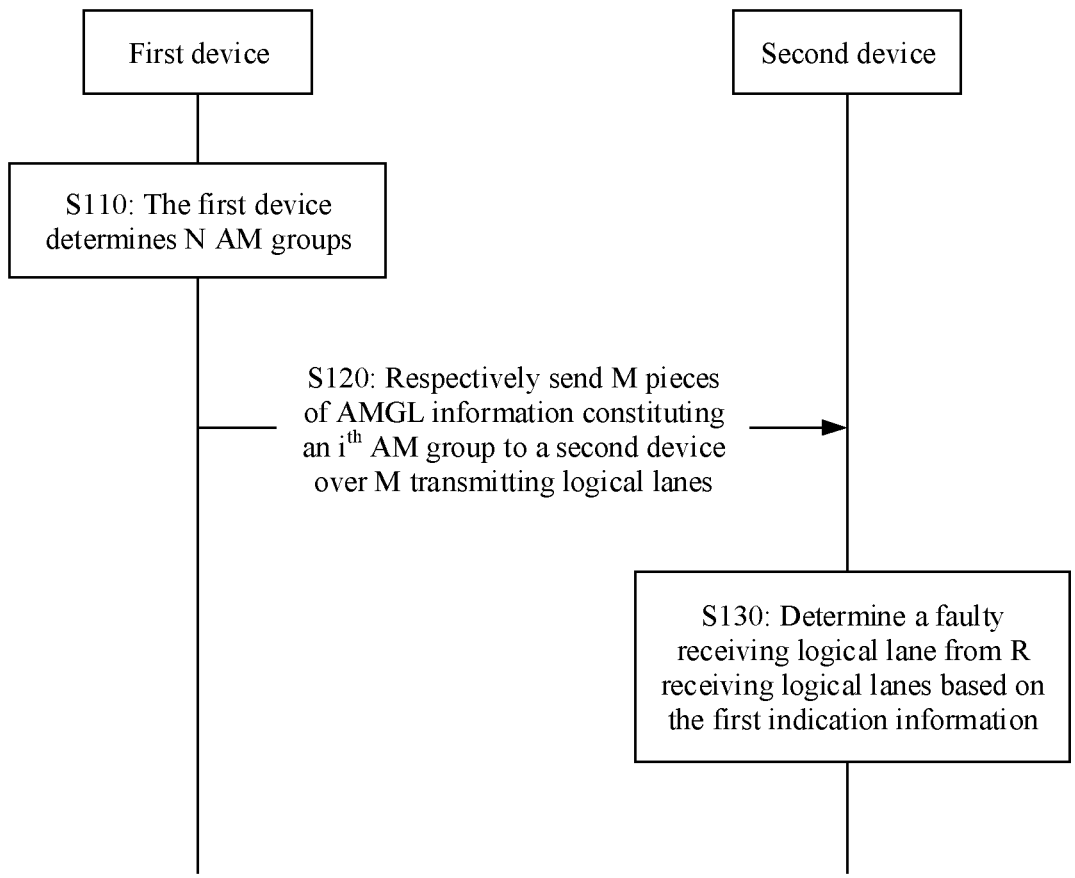
FIG. 6 is a schematic diagram of a method for indicating a fault status according to an embodiment of this application.

FIG. 6 shows a method 100 for indicating a fault status according to an embodiment of this application. The method 100 includes the following steps.

S110: A first device determines N alignment marker AM groups, where the N AM groups include first indication information, the first indication information is used to indicate a fault status of R receiving logical lanes of the first device, and each of the N AM groups includes M pieces of alignment marker group lane AMGL information.

Each of the N AM groups may consist of an integer quantity of code blocks, each code block has a same size, and each AM group has different compositions depending on Ethernet speeds. For example, for a 200G Ethernet interface, an AM group includes four 257-bit code blocks. For another example, for a 400G Ethernet interface, an AM group includes eight 257-bit code blocks. For still another example, for a 100G Ethernet interface, an AM group includes five 257-bit code blocks. For an Ethernet interface of another speed, an AM group includes a plurality of code blocks of a plurality of bits, and a composition of the AM group is specifically determined as required.

It should be noted that the fault status may indicate that there is a fault or no fault. In other words, the first indication information is used to indicate which of the R receiving logical lanes of the first device is faulty and which of the R receiving logical lanes is not faulty. Optionally, none of the R receiving logical lanes are faulty; or all of the R receiving logical lanes are faulty; or some of the R receiving logical lanes are faulty, while the other logical lanes are not faulty.

It should also be noted that from the foregoing relationship between a physical lane and a logical lane, it can be learned that a physical lane fault causes a logical lane fault, but a logical lane fault does not necessarily cause a physical lane fault. For example, if one logical lane corresponds to one physical lane, a physical lane fault causes a logical lane fault, and a logical lane fault may also cause a physical lane fault. For another example, if two logical lanes 1 and 2 correspond to one physical lane, a physical lane fault causes both the logical lanes 1 and 2 to be faulty. However, when the logical lane 1 is faulty, a connection relationship between the logical lane 2 and the physical lane is not affected. In other words, a fault of a logical lane mentioned in this embodiment of this application may be a fault of the logical lane itself, or may be a fault of the logical lane that is caused by a fault of a physical lane.

Optionally, when the first device determines that a faulty receiving logical lane exists in the R receiving logical lanes, the first device performs S110. Optionally, the first device may also trigger S110 according to a period or some specific rules. In other words, a condition for triggering S110 is not limited in this embodiment of this application. S110 may be triggered when the first device determines that a faulty receiving logical lane exists. Alternatively, regardless of whether a faulty receiving logical lane exists, S110 may be triggered according to a specific rule or a specific time.

If the first device does not receive data from a receiving logical lane within a preset time, it may be considered that the receiving logical lane is faulty. For example, the preset time may be a plurality of consecutive periods.

S120: In an $i^{th}$ period of N periods, the first device respectively sends M pieces of AMGL information constituting an $i^{th}$ AM group to a second device over M transmitting logical lanes, and the second device receives the M pieces of AMGL information constituting the $i^{th}$ AM group and sent by the first device over the M transmitting logical lanes, where the N periods are in a one-to-one correspondence with the N AM groups, and the N AM groups are used for the second device to align data sent by the first device over the M transmitting logical lanes in the N periods, where M, N, and R are positive integers, and i is a positive integer greater than 0 and less than or equal to N.

The first device and the second device perform S120 N times, so that AMGL information constituting the N AM groups can be sent to the second device. For ease of description, only the $i^{th}$ period is described herein. An actual sending process may be as follows: in each period of the N periods, the first device respectively sends M pieces of AMGL information constituting each AM group to the second device over the M transmitting logical lanes. That is, the N AM groups sent over the M transmitting logical lanes in the N periods may indicate the fault status of the R receiving logical lanes of the first device.

In an optional embodiment, the M transmitting logical lanes and the R receiving logical lanes are PCSLs or FECLs.

In an optional embodiment, S120 includes: distributing, by the first device, the M pieces of AMGL information constituting the $i^{th}$ AM group to the M transmitting logical lanes; and sending, by the first device, the M pieces of AMGL information constituting the $i^{th}$ AM group to receiving physical lanes of the second device over transmitting physical lanes corresponding to the M transmitting logical lanes. To be specific, as can be learned from the foregoing relationship between a logical lane and a physical lane, the first device needs to first distribute the M pieces of AMGL information to the M transmitting logical lanes; the M transmitting logical lanes have a correspondence with the transmitting physical lanes, and accordingly, the M pieces of AMGL information are sent to the receiving physical lanes of the first device over the transmitting physical lanes corresponding to the M transmitting logical lanes, and the M pieces of AMGL information are transferred from the receiving physical lanes of the first device to the corresponding logical lanes.

It should be noted that one piece of alignment marker group lane (AMGL) information is sent over one of the M transmitting logical lanes, that is, the M transmitting logical lanes are in a one-to-one correspondence with the M pieces of AMGL information.

It should also be noted that one AM group may be sent over the M transmitting logical lanes in one period, and the N AM groups may be sent in the N periods. When N=1, first indication information included in one AM group sent in one period may indicate the fault status of the R receiving logical lanes of the first device. When N is greater than 1, first indication information included in a plurality of AM groups sent in a plurality of periods may indicate the fault status of the R receiving logical lanes of the first device, that is, the plurality of AM groups include one piece of first indication information in total.

M pieces of AMGL information constituting one AM group are described below in two cases.

Case 1: First AMGL information in the M pieces of AMGL information includes a first alignment marker AM. Second AMGL information in the M pieces of AMGL information includes a second AM and a padding bit. Third AMGL information in the M pieces of AMGL information includes a third AM, a padding bit, and a status field bit. The first AM, the second AM, and the third AM each include a unique padding bit. For example, unique padding fields are $UP_0$, $UP_1$, and $UP_2$ in FIG. 3. That is, some AMGL information in the M pieces of AMGL information includes only an AM, some AMGL information includes both an AM and a padding bit, and some AMGL information includes an AM, a padding bit, and a status field bit. In other words, in one period, only an AM is sent over some of the M transmitting logical lanes, both an AM and a padding bit are sent over some of the transmitting logical lanes, and an AM, a padding bit, and a status field bit are sent over some of the transmitting logical lanes. For example, for the 200G or 400G Ethernet interface, only an AM is sent over some of the 8 or 16 transmitting logical lanes, both an AM and a padding bit are sent over some of the transmitting logical lanes, and an AM, a padding bit, and a status field bit are sent over some of the transmitting logical lanes.

For example, AMGL information sent over the transmitting logical lane with lane index 7 in Table 1 is first AMGL information, and the first AMGL information includes only an AM, that is, $a_7, a_{15}, \ldots, a_{95}$. For another example, AMGL information sent over each of the transmitting logical lanes with lane indexes 0 to 5 in Table 1 is second AMGL information, and the second AMGL information includes both an AM and a padding bit. For example, for the transmitting logical lane with lane index 0, AMGL information sent over the transmitting logical lane with lane index 0 includes an AM, that is, $a_0, a_8, \ldots, a_{88}$, and further includes padding bits $a_{96}$. For another example, AMGL information sent over the transmitting logical lane with lane index 6 in Table 1 is third AMGL information, and an AM included in the third AMGL information is $a_6, a_{14}, \ldots, a_{94}$, and padding bits and status field bits included are $a_{102}$.

In Case 1, one AM group includes the first AMGL information, the second AMGL information, and the third AMGL information. Optionally, one AM group includes at least one of the first AMGL information, the second AMGL information, and the third AMGL information. That is, which AMGL information is included in an AM group may be determined as required.

Case 2: First AMGL information in the M pieces of AMGL information includes a fourth AM, and second AMGL information in the M pieces of AMGL information includes a fifth AM and a padding bit. That is, some AMGL information in the M pieces of AMGL information includes only an AM, and some AMGL information includes both an AM and a padding bit. In other words, in one period, only an AM is sent over some of the M transmitting logical lanes, and both an AM and a padding bit are sent over some of the transmitting logical lanes.

For example, for a 100G Ethernet interface, only an AM is sent over some of the four transmitting logical lanes, and both an AM and a padding bit are sent over some of the transmitting logical lanes.

It is to be appreciated that the M pieces of AMGL information constituting one AM group are not limited to the foregoing two cases, and there may also be other cases. This is not limited in this embodiment of this application.

In this embodiment of this application, a form of the first indication information is not limited at all. In other words, the first indication information carried in the N AM groups may be a value obtained without performing any operation based on a value indicating the fault status of the R receiving logical lanes, or may be a value obtained after some operations are performed. For example, the operation may be an XOR operation, or a scrambling operation, or the like. The XOR operation or the scrambling operation is described below with examples.

XOR Operation:

For example, in a 200G Ethernet technology, it is assumed that the first indication information is carried in a unique padding bit $UP_0$ of an AM of each piece of AMGL information, and when the first indication information is not sent, an original code of $UP_0$ of an AM in AMGL information on a $j^{th}$ transmitting logical lane is $UP_0j$. When all the eight receiving logical lanes are not faulty, a status of the receiving logical lanes is $Ls=\{0, 0, 0, 0, 0, 0, 0, 0\}$, a code of $UP_0$ of the AM in the AMGL information on the $j^{th}$ transmitting logical lane that constitutes the first indication information changes to $RLs=Ls \oplus UP_0j$. That is, the code $RLs=Ls \oplus UP_0j$ of $UP_0$ on the $j^{th}$ transmitting logical lane is a part (if the first indication information is sent by using the $j^{th}$ transmitting logical lane and other transmitting logical lanes) or all (if the first indication information is sent by using only the $j^{th}$ sending logical lane) of the first indication information. For example, when the first indication information is not sent, and the original code of $UP_0$ of the AM in the AMGL information on the $j^{th}$ transmitting logical lane is 0x05, $RLs=0x00 \oplus 0x05=0x05$. For another example, when the first indication information is not sent, and the original code of $UP_0$ of the AM in the AMGL information on the $j^{th}$ transmitting logical lane is 0x04, $RLs=0x00 \oplus 0x04=0x04$. For still another example, assuming that the second logical lane in the eight transmitting logical lanes is faulty, a fault status of the logical lanes is $Ls=\{0, 1, 0, 0, 0, 0, 0, 0\}$. When the first indication information is not sent, and the original code of $UP_0$ of the AM in the AMGL information on the $j^{th}$ transmitting logical lane is 0x05, $RLs=0x02 \oplus 0x05=0x07$. When the code of $UP_0$ of the AM in the AMGL information on the $j^{th}$ transmitting logical lane received by the second device is 0x07, the second device determines, based on the original code 0x05 of $UP_0$ of the AM in the AMGL information on the $j^{th}$ transmitting logical lane, that a fault status of the receiving logical lanes of the first device is $RLs=0x05 \oplus 0x07=0x02$. The second device may learn that a receiving logical lane of the first device is faulty.

Scrambling Operation:

For example, in the 200G Ethernet technology, it is assumed that the first indication information is carried in a unique padding bit $UP_0$ of an AM of each piece of AMGL information. The first device performs a scrambling operation on a value of the fault status of the R receiving logical lanes. For example, a frame-synchronous scrambling polynomial $1+X^6+X^7$ (the International Telecommunication Union Telecommunication Standardization Sector G.707 specification) is used to perform a scrambling operation on the value of the fault status of the R receiving logical lanes. The first device sends a scrambled value to corresponding transmitting logical lanes. The second device performs descrambling on the scrambled value to obtain the fault status of the R receiving logical lanes.

The following describes a relationship between the first indication information and the N AM groups in cases (a), (b), (c), and (d).

In an optional embodiment, Q pieces of AMGL information in the M pieces of AMGL information constituting each of the N AM groups include the first indication information, where $L \cdot R = N \cdot P \cdot Q$, P is a quantity of bits of each of the Q pieces of AMGL information occupied by the first indication information, and L, P, and Q are positive integers. Optionally, L may be understood as an L-fold redundancy of the fault status of the R receiving logical lanes. It should be noted that a relationship between L, R, P, N, and Q is not limited in this embodiment of this application, and the relationship $L \cdot R = N \cdot P \cdot Q$ may be satisfied, or the relationship may not be satisfied. In practical applications, L, R, P, N, and Q may be determined based on actual needs.

L, P, Q, R and N are discussed in the following cases:

(a) L=1, P=1, and Q=1. In this case, R=N, that is, only 1 bit in AMGL information on one transmitting logical lane in one period is used to indicate a fault status of one receiving logical lane. In other words, only one of the M pieces of AMGL information constituting one AM group carries 1 bit of the first indication information to indicate the fault status of one receiving logical lane, and it takes N periods to indicate the fault status of the R (R=N) receiving logical lanes. For example, the N periods may be N consecutive periods or N periods according to a specific rule, for example, N periods at equal intervals.

For example, for a 100G Ethernet technology, there are four receiving FECLs. One piece of AMGL information in each of the four AM groups sent by the first device in four periods carries 1 bit of the first indication information, and then a total of 4 bits are used to indicate a fault status of the four receiving FECLs.

For another example, for a 200G Ethernet technology, there are eight receiving FECLs or PCSLs. One piece of AMGL information in each of the eight AM groups sent by the first device in eight periods carries 1 bit of the first indication information, and then a total of 8 bits are used to indicate a fault status of the eight receiving FECLs or PCSLs.

For another example, for a 400G Ethernet technology, there are 16 receiving FECLs or PCSLs. One piece of AMGL information in each of the 16 AM groups sent by the first device in 16 periods carries 1 bit of the first indication information, and then a total of 16 bits are used to indicate a fault status of the 16 receiving FECLs or PCSLs.

Optionally, in Case (a), the first indication information is carried in a reserved bit of a status field of the Q pieces of AMGL information. For example, for the 200G Ethernet technology, bit [1025] of an AM group is a reserved bit, and bit [1025] of each of the N AM groups may be used to indicate the fault status of the R (R=N) receiving lanes. Optionally, in Case (a), the first indication information is carried in a padding bit of the Q pieces of AMGL information. For example, the padding bit may be a unique padding bit. That is, in Case (a), 1 bit in one piece of AMGL information in each of the N periods may be used, and a total of N bits may be used to carry the fault status the R (R=N) receiving logical lanes. The bit may be a reserved bit of a status field, or a padding bit, or a unique padding bit, or other bits, which is not limited in this embodiment of this application.

(b) L=1, N=1, Q=1, and the first indication information is carried in a padding bit of the Q pieces of AMGL information. In this case, R=P, and P bits in AMGL information on one transmitting logical lane in one period are used to indicate the fault status of the R (R=P) receiving logical lanes. In other words, only one of the M pieces of AMGL information constituting one AM group carries P bits of the first indication information to indicate the fault status of the R (R=P) receiving logical lanes, and it takes only one period to indicate the fault status of the R receiving logical lanes.

For example, for the 100G Ethernet technology, there are four receiving FECLs, and 4 bits of one piece of AMGL information in an AM group sent by the first device in one period are used to indicate a fault status of the four receiving FECLs. For example, padding bits [1280 to 1283] of an AM group are used to indicate a fault status of four FECLs.

For another example, for the 200G Ethernet technology, there are eight receiving FECLs or PCSLs, and 8 bits of one piece of AMGL information in an AM group sent by the first device in one period are used to indicate a fault status of the eight receiving FECLs. For example, padding bits [960 to 967] of an AM group are used to indicate a fault status of eight FECLs. For another example, bit [960], bit [970], bit [980], bit [990], bit [1000], bit [1010], bit [1020], and bit [1023] in padding bits of an AM group are used to indicate the fault status of the eight FECLs. Alternatively, $UP_0$ or $UP_1$ or $UP_2$ of an AM may be used to indicate the fault status of the eight FECLs, where $UP_0$ or $UP_1$ or $UP_2$ is 8 bits.

For still another example, for the 400G Ethernet technology, there are 16 receiving FECLs or PCSLs, and 16 bits of one piece of AMGL information in an AM group sent by the first device in one period are used to indicate a fault status of the 16 receiving FECLs or PCSLs. For example, padding bits [1920 to 1935], or bit [1920], bit [1930], bit [1940], bit [1950], bit [1960], bit [1970], bit [1980], bit [1990], bit [2000], bit [2010], bit [2020], bit [2030], bit [2040], bit [2050], bit [2051], and bit [2052] in padding bits of an AM group are used to indicate the fault status of the 16 FECLs. Alternatively, $UP_0$ and $UP_1$ (16 bits in total) or $UP_0$ and $UP_2$ (16 bits in total) or $UP_1$ and $UP_2$ (16 bits in total) of an AM may be used to indicate the fault status of the 16 FECLs, where $UP_0$ or $UP_1$ or $UP_2$ is 8 bits.

Optionally, in Case (b), the first indication information is carried in a padding bit of the Q pieces of AMGL information, and the padding bit may be a unique padding bit.

In Cases (a) and (b), one bit is used to indicate a fault status of one receiving logical lane. A fault status of a plurality of receiving logical lanes can be indicated in a plurality of periods in Case (a), or a fault status of a plurality of receiving logical lanes can be indicated by a plurality of bits of one piece of AMGL information on one transmitting logical lane in one period in Case (b). If a transmitting logical lane is not faulty, Cases (a) and (b) can not only indicate the fault status of the plurality of receiving logical lanes, but also can reduce signaling overheads because one logical lane is indicated by only one bit. However, if a transmitting logical lane may also be faulty, that is, when a plurality of bits in AMGL information on a transmitting logical lane indicate a fault status of a receiving logical lane, and it happens that the transmitting logical lane is also faulty, the second device possibly cannot know the fault status of the receiving logical lane of the first device. Therefore, it is necessary to send the first indication information to the second device over a plurality of transmitting logical lanes in the M transmitting logical lanes. Therefore, the following Case (c) and Case (d) are introduced.

(c) N=1, P=R, and the first indication information is carried in a padding bit of each of the Q pieces of AMGL information. One piece of AMGL information corresponds to one transmitting logical lane. In other words, padding bits (P=R) that are of AMGL information on each of Q transmitting logical lanes in one period and that have the same quantity as the transmitting logical lanes are used to carry the first indication information. In this case, L=Q, and a quantity of transmitting logical lanes over which the AMGL information is sent indicates a redundancy of the quantity of folds for which the second device can receive the fault status of the R receiving logical lanes.

For the 200G Ethernet technology, there are eight receiving FECLs or PCSLs, and 8 bits of some or all of the eight pieces of AMGL information in one AM group sent by the first device in one period are used to indicate a fault status of the eight receiving FECLs or PCSLs. Examples are as follows:

Example 1: $UP_0$ or $UP_1$ or $UP_2$ of each of the eight AMs in eight pieces of AMGL information constituting one AM group is used to indicate the fault status of the eight FECLs or PCSLs, where $UP_0$ or $UP_1$ or $UP_2$ is 8 bits. In this case, Q=8, P=R=8, and L=8. If no transmitting logical lane is faulty, the second device can receive the first indication information of 64 (8*8) bits to indicate the fault status of the eight receiving FECLs or PCSLs, and a fault status of each receiving FECL or PCSL has an 8-fold redundancy. If one of the transmitting logical lanes is faulty, AMGL information sent over the transmitting logical lane cannot be received by the second device, and the second device can receive the first indication information of only 56 (7*8) bits to indicate the fault status of the eight receiving FECLs or PCSLs, and a fault status of each receiving FECL or PCSL has a 7-fold redundancy.

In Example 1, the 8 bits may also be padding bits.

Example 2: 8 bits of $UP_0$ or $UP_1$ or $UP_2$ of each of the four AMs in four pieces of AMGL information constituting one AM group are used to indicate the fault status of the eight FECLs or PCSLs, where $UP_0$ or $UP_1$ or $UP_2$ is 8 bits. In this case, Q=4, P=R=8, and L=4. If no transmitting logical lane is faulty, the second device can receive the first indication information of 32 bits to indicate the fault status of the eight receiving FECLs or PCSLs, and a fault status of each receiving FECL or PCSL has a 4-fold redundancy. If one of the transmitting logical lanes is faulty, AMGL information sent over the transmitting logical lane cannot be received by the second device, and the second device can receive the first indication information of only 24 bits to indicate the fault status of the eight receiving FECLs or PCSLs, and a fault status of each receiving FECL or PCSL has a 3-fold redundancy.

In Example 2, the 8 bits may also be padding bits.

Example 3: 8 bits of $UP_0$ or $UP_1$ or $UP_2$ of each of the five AMs in five pieces of AMGL information constituting one AM group are used to indicate the fault status of the eight FECLs or PCSLs, where $UP_0$ or $UP_1$ or $UP_2$ is 8 bits. In this case, Q=5, P=R=8, and L=5. If no transmitting logical lane is faulty, the second device can receive the first indication information of 40 bits to indicate the fault status of the eight receiving FECLs or PCSLs, and a fault status of each receiving FECL or PCSL has a 5-fold redundancy. If one of the transmitting logical lanes is faulty, AMGL information sent over the transmitting logical lane cannot be received by the second device, and the second device can receive the first indication information of only 32 bits to indicate the fault status of the eight receiving FECLs or PCSLs, and a fault status of each receiving FECL or PCSL has a 4-fold redundancy.

In Example 3, the 8 bits may also be padding bits.

For the 400G Ethernet technology, there are 16 receiving FECLs or PCSLs, and 16 bits of some or all of the 16 pieces of AMGL information in one AM group sent by the first device in one period are used to indicate a fault status of the 16 receiving FECLs or PCSLs. Examples are as follows:

Example 1: $UP_0$ and $UP_1$ (16 bits in total) or $UP_0$ and $UP_2$ (16 bits in total) or $UP_1$ and $UP_2$ (16 bits in total) of each of the 16 AMs in 16 pieces of AMGL information constituting one AM group are used to indicate the fault status of the 16 FECLs or PCSLs, where $UP_0$ or $UP_1$ or $UP_2$ is 8 bits. In this case, Q=16, P=R=16, and L=16. If no transmitting logical lane is faulty, the second device can receive the first indication information of 256 (16*16) bits to indicate the fault status of the 16 receiving FECLs or PCSLs, and a fault status of each receiving FECL or PCSL has a 16-fold redundancy. If one of the transmitting logical lanes is faulty, AMGL information sent over the transmitting logical lane cannot be received by the second device, and the second device can receive the first indication information of only 240 (16*15) bits to indicate the fault status of the 16 receiving FECLs or PCSLs, and a fault status of each receiving FECL or PCSL has a 15-fold redundancy.

Example 2: $UP_0$ and $UP_1$ (16 bits in total) or $UP_0$ and $UP_2$ (16 bits in total) or $UP_1$ and $UP_2$ (16 bits in total) of each of the eight AMs in eight pieces of AMGL information in 16 pieces of AMGL information constituting one AM group are used to indicate the fault status of the 16 FECLs or PCSLs, where $UP_0$ or $UP_1$ or $UP_2$ is 8 bits. In this case, Q=8, P=R=16, and L=8. If no transmitting logical lane is faulty, the second device can receive the first indication information of 128 (16*8) bits to indicate the fault status of the 16 receiving FECLs or PCSLs, and a fault status of each receiving FECL or PCSL has an 8-fold redundancy. If one of the transmitting logical lanes is faulty, AMGL information sent over the transmitting logical lane cannot be received by the second device, and the second device can receive the first indication information of only 112 (16*7) bits to indicate the fault status of the 16 receiving FECLs or PCSLs, and a fault status of each receiving FECL or PCSL has a 7-fold redundancy.

Example 3: $UP_0$ and $UP_1$ (16 bits in total) or $UP_0$ and $UP_2$ (16 bits in total) or $UP_1$ and $UP_2$ (16 bits in total) of each of the four AMs in four pieces of AMGL information in 16 pieces of AMGL information constituting one AM group are used to indicate the fault status of the 16 FECLs or PCSLs, where $UP_0$ or $UP_1$ or $UP_2$ is 8 bits. In this case, Q=4, P=R=16, and L=4. If no transmitting logical lane is faulty, the second device can receive the first indication information of 64 (16*4) bits to indicate the fault status of the 16 receiving FECLs or PCSLs, and a fault status of each receiving FECL or PCSL has a 4-fold redundancy. If one of the transmitting logical lanes is faulty, AMGL information sent over the transmitting logical lane cannot be received by the second device, and the second device can receive the first indication information of only 48 (16*3) bits to indicate the fault status of the 16 receiving FECLs or PCSLs, and a fault status of each receiving FECL or PCSL has a 3-fold redundancy.

(d) R=N·P, and the first indication information is carried in a padding bit of each of the Q pieces of AMGL information. One piece of AMGL information corresponds to one transmitting logical lane. In other words, P padding bits of AMGL information on each of Q transmitting logical lanes in N periods are used to carry the first indication information. In this case, L=Q, and a quantity of transmitting logical lanes over which the AMGL information is sent indicates a redundancy of the quantity of folds for which the second device can receive the fault status of the R receiving logical lanes.

For the 200G Ethernet technology, there are eight receiving FECLs or PCSLs, and a plurality of bits of some or all of the eight pieces of AMGL information in each of the N AM groups sent by the first device in N periods are used to indicate a fault status of the eight receiving FECLs or PCSLs. Examples are as follows:

Example 1: 2 bits of $UP_0$ or $UP_1$ or $UP_2$ of each of the eight AMs in eight pieces of AMGL information constituting each of the four AM groups are used to indicate the fault status of the eight FECLs or PCSLs, where $UP_0$ or $UP_1$ or $UP_2$ is 8 bits. In this case, R=8, Q=8, P=2, N=4, and L=8. If no transmitting logical lane is faulty, the second device can receive the first indication information of 64 (8*2*4) bits to indicate the fault status of the eight receiving FECLs or PCSLs, and a fault status of each receiving FECL or PCSL has an 8-fold redundancy. If one of the transmitting logical lanes is faulty, AMGL information sent over the transmitting logical lane cannot be received by the second device, and the second device can receive the first indication information of only 56 (7*2*4) bits to indicate the fault status of the eight receiving FECLs or PCSLs, and a fault status of each receiving FECL or PCSL has a 7-fold redundancy.

In Example 1, the 2 bits may also be padding bits.

Example 2: 1 bit of each of the eight AMs in eight pieces of AMGL information constituting each of the eight AM groups (the 1 bit may be a padding bit, or a unique padding bit, or a reserved bit of a status field) is used to indicate the fault status of the eight FECLs or PCSLs. In this case, R=8, Q=8, P=1, N=8, and L=8. If no transmitting logical lane is faulty, the second device can receive the first indication information of 64 (8*1*8) bits to indicate the fault status of the eight receiving FECLs or PCSLs, and a fault status of each receiving FECL or PCSL has an 8-fold redundancy. If one of the transmitting logical lanes is faulty, AMGL information sent over the transmitting logical lane cannot be received by the second device, and the second device can receive the first indication information of only 56 (8*1*7) bits to indicate the fault status of the eight receiving FECLs or PCSLs, and a fault status of each receiving FECL or PCSL has a 7-fold redundancy.

Example 3: 4 bits of $UP_0$ or $UP_1$ or $UP_2$ of each of the six AMs in six pieces of AMGL information constituting in eight pieces of AMGL information constituting each of the two AM groups are used to indicate the fault status of the eight FECLs or PCSLs, where $UP_0$ or $UP_1$ or $UP_2$ is 8 bits. In this case, R=8, Q=6, P=4, N=2, and L=6. If no transmitting logical lane is faulty, the second device can receive the first indication information of 48 (6*2*4) bits to indicate the fault status of the eight receiving FECLs or PCSLs, and a fault status of each receiving FECL or PCSL has a 6-fold redundancy. If one of the transmitting logical lanes is faulty, AMGL information sent over the transmitting logical lane cannot be received by the second device, and the second device can receive the first indication information of only 40 (5*2*4) bits to indicate the fault status of the eight receiving FECLs or PCSLs, and a fault status of each receiving FECL or PCSL has a 5-fold redundancy.

In Example 3, the 4 bits may also be padding bits.

For the 400G Ethernet technology, there are 16 receiving FECLs or PCSLs, and a plurality of bits of some or all of the 16 pieces of AMGL information in each of the N AM groups sent by the first device in N periods are used to indicate a fault status of the 16 receiving FECLs or PCSLs. Examples are as follows:

Example 1: 4 bits of $UP_0$ or $UP_1$ or $UP_2$ of each of the 16 AMs in all of the 16 pieces of AMGL information constituting each of the four AM groups are used to indicate the fault status of the 16 FECLs or PCSLs, where $UP_0$ or $UP_1$ or $UP_2$ is 8 bits. In this case, R=16, Q=16, P=4, N=4, and L=16. If no transmitting logical lane is faulty, the second device can receive the first indication information of 256 (4*4*16) bits to indicate the fault status of the 16 receiving FECLs or PCSLs, and a fault status of each receiving FECL or PCSL has a 16-fold redundancy. If one of the transmitting logical lanes is faulty, AMGL information sent over the transmitting logical lane cannot be received by the second device, and the second device can receive the first indication information of only 240 (4*4*15) bits to indicate the fault status of the 16 receiving FECLs or PCSLs, and a fault status of each receiving FECL or PCSL has a 15-fold redundancy.

In Example 1, the 4 bits may also be padding bits.

Example 2: 2 bits of $UP_0$ or $UP_1$ or $UP_2$ of each of the 16 AMs in the 16 pieces of AMGL information constituting each of the eight AM groups are used to indicate the fault status of the 16 FECLs or PCSLs. In this case, R=16, Q=16, P=2, N=8, and L=16. If no transmitting logical lane is faulty, the second device can receive the first indication information of 256 (2*8*16) bits to indicate the fault status of the 16 receiving FECLs or PCSLs, and a fault status of each receiving FECL or PCSL has a 16-fold redundancy. If one of the transmitting logical lanes is faulty, AMGL information sent over the transmitting logical lane cannot be received by the second device, and the second device can receive the first indication information of only 240 (2*8*15) bits to indicate the fault status of the 16 receiving FECLs or PCSLs, and a fault status of each receiving FECL or PCSL has a 15-fold redundancy.

In Example 2, the 2 bits may also be padding bits.

Example 3: 8 bits of $UP_0$ or $UP_1$ or $UP_2$ of each of the eight AMs in eight pieces of AMGL information in the 16 pieces of AMGL information constituting each of the 2 AM groups are used to indicate the fault status of the 16 FECLs or PCSLs. In this case, R=16, Q=8, P=8, N=2, and L=8. If no transmitting logical lane is faulty, the second device can receive the first indication information of 128 (2*8*8) bits to indicate the fault status of the 16 receiving FECLs or PCSLs, and a fault status of each receiving FECL or PCSL has an 8-fold redundancy. If one of the transmitting logical lanes is faulty, AMGL information sent over the transmitting logical lane cannot be received by the second device, and the second device can receive the first indication information of only 112 (2*8*7) bits to indicate the fault status of the 16 receiving FECLs or PCSLs, and a fault status of each receiving FECL or PCSL has a 7-fold redundancy.

In Example 3, the 8 bits may also be padding bits.

In an optional embodiment, in the foregoing Case (a), N=R, that is, a quantity of receiving logical lanes is equal to a quantity of periods. In Case (d), a quantity of receiving logical lanes is equal to a quantity of periods multiplied by a quantity of bits of each piece of AMGL information occupied by the first indication information. That is, as long as N in Cases (a) and (d) is greater than 1, the first device needs a plurality of periods to send the first indication information to the second device. Therefore, the start of the N periods needs to be triggered. Certainly, when N is equal to 1, the start of the N periods may also be triggered. In an optional embodiment, before S120, the method further includes: respectively sending, by the first device, M pieces of AMGL information constituting a first AM group to the second device over the M transmitting logical lanes, where the first AM group includes second indication information, the second indication information is used to indicate that the N AM groups include the first indication information, the first indication information is carried in a first bit field of the Q pieces of AMGL information, and the second indication information is carried in the first bit field of at least some of the M pieces of AMGL information constituting the first AM group. The first AM group does not belong to the foregoing N AM groups. That is, before the first indication information is sent, the second indication information needs to be carried in the first AM group, to indicate the second device to receive, based on the second indication information, the M pieces of AMGL information constituting the $i^{th}$ AM group and sent by the first device over the M transmitting logical lanes.

For example, in the examples of Case (a), the first indication information is carried in the reserved bit of the status field of the Q pieces of AMGL information, and the second indication information is also carried in the reserved bit of the Q pieces of AMGL information; one receiving logical lane corresponds to one bit, and the second indication information also occupies one bit. In the 100G example of Case (a), the first device transfers and sends a "remote defect indication (remote defect indication, RDI)" to the second device by using a sequence of 5 bits in total consisting of one reserved bit in a status field of each of the five AM groups in five consecutive periods, the $1^{st}$ AM group in the five AM groups is the first AM group, and the remaining four AM groups are the foregoing N AM groups, that is, N=4 in this case. In the sequence of 5 bits, the first bit identifies the "start of a remote defect sequence", and the subsequent 4 bits respectively represent a remote defect status of the four FECLs in sequence, where "1" indicates that a remote defect occurs, and "0" indicates that there is no fault. In the 200G example of Case (a), the first device transfers and sends a "remote defect indication" to the second device by using a sequence of 9 bits in total consisting of one reserved bit in a status field of each of the nine AM groups in nine consecutive periods, the $1^{st}$ AM group in the nine AM groups is the first AM group, and the remaining eight AM groups are the foregoing N AM groups, that is, N=8 in this case. In the sequence of 9 bits, the first bit identifies the "start of a remote defect sequence", and the subsequent 8 bits respectively represent a remote defect status of the eight FECLs or PCSLs in sequence, where "1" indicates that a remote defect occurs, and "0" indicates that there is no fault. In the 400G example of Case (a), the first device transfers and sends a "remote defect indication" to the second device by using a sequence of 17 bits in total consisting of one reserved bit in a status field of each of the 17 AM groups in 17 consecutive periods, the $1^{st}$ AM group in the 17 AM groups is the first AM group, and the remaining 16 AM groups are the foregoing N AM groups, that is, N=16 in this case. In the sequence of 17 bits, the first bit identifies the "start of a remote defect sequence", and the subsequent 16 bits respectively represent a remote defect status of the 16 FECLs or PCSLs in sequence, where "1" indicates that a remote defect occurs, and "0" indicates that there is no fault. The remote defect indication herein may also be referred to as a remote fault status indication.

For example, in the examples of Case (d), the first indication information is carried in the padding bit of each of the Q pieces of AMGL information, and the second indication information is also carried in a unique padding bit of the Q pieces of AMGL information in the first AM group. The first indication information is carried in a unique padding bit of each of the Q pieces of AMGL information, and the second indication information is also carried in a padding bit of the Q pieces of AMGL information in the first AM group. In Example 1 for the 200G Ethernet of Case (d), the first device transfers and sends a "remote defect indication" to the second device by using eight sequences of 10 bits in total consisting of 2 bits in $UP_0$, $UP_1$, or $UP_2$ of each of the eight AMs in eight pieces of AMGL information of each of the five AM groups in five consecutive periods, the 1 AM group in the five AM groups is the first AM group, and the remaining four AM groups are the foregoing N AM groups, that is, N=4 in this case. In each sequence of 10 bits, the first 2 bits identify the "start of a remote defect sequence", and the subsequent 8 bits respectively represent a remote defect status of the eight FECLs or PCSLs in sequence, where "1" indicates that a remote defect occurs, and "0" indicates that there is no fault. In Example 2 for the 200G Ethernet of Case (d), the first device transfers and sends a "remote defect indication (remote defect indication, RDI)" to the second device by using eight sequences of 9 bits in total consisting of 1 bit in each of the eight AMs in eight pieces of AMGL information of each of the nine AM groups in nine consecutive periods, the $1^{st}$ AM group in the nine AM groups is the first AM group, and the remaining eight AM groups are the foregoing N AM groups, that is, N=8 in this case. In each sequence of 9 bits, the first bit identifies the "start of a remote defect sequence", and the subsequent 8 bits respectively represent a remote defect status of the eight FECLs or PCSLs in sequence, where "1" indicates that a remote defect occurs, and "0" indicates that there is no fault. In Example 3 for the 200G Ethernet of Case (d), the first device transfers and sends a "remote defect indication (remote defect indication, RDI)" to the second device by using six sequences of 12 bits in total consisting of 4 bits in each of the six AMs in six pieces of AMGL information of each of the three AM groups in three consecutive periods, the $1^{st}$ AM group in the three AM groups is the first AM group, and the remaining two AM groups are the foregoing N AM groups, that is, N=2 in this case. In each sequence of 12 bits, the first 4 bits identify the "start of a remote defect sequence", and the subsequent 8 bits respectively represent a remote defect status of the eight FECLs or PCSLs in sequence, where "1" indicates that a remote defect occurs, and "0" indicates that there is no fault. In Example 1 for the 400G Ethernet of Case (d), the first device transfers and sends a "remote defect indication" to the second device by using 16 sequences of 20 bits in total consisting of 4 bits in each of the 16 AMs in the 16 pieces of AMGL information in each of the five AM groups in five consecutive periods, the $1^{st}$ AM group in the five AM groups is the first AM group, and the remaining four AM groups are the foregoing N AM groups, that is, N=4 in this case. In each sequence of 20 bits, the first 4 bits identify the "start of a remote defect sequence", and the subsequent 16 bits respectively represent a remote defect status of the 16 FECLs or PCSLs in sequence, where "1" indicates that a remote defect occurs, and "0" indicates that there is no fault. In Example 2 for the 400G Ethernet of Case (d), the first device transfers and sends a "remote defect indication" to the second device by using 16 sequences of 18 bits in total consisting of 2 bits in each of the 16 AMs in the 16 pieces of AMGL information in each of the nine AM groups in nine consecutive periods, the $1^{st}$ AM group in the nine AM groups is the first AM group, and the remaining eight AM groups are the foregoing N AM groups, that is, N=8 in this case. In each sequence of 18 bits, the first 2 bits identify the "start of a remote defect sequence", and the subsequent 16 bits respectively represent a remote defect status of the 16 FECLs or PCSLs in sequence, where "1" indicates that a remote defect occurs, and "0" indicates that there is no fault. In Example 3 for the 400G Ethernet of Case (d), the first device transfers and sends a "remote defect indication" to the second device by using 16 sequences of 24 bits in total consisting of 8 bits in each of the eight AMs in eight pieces of AMGL information of each of the three AM groups in three consecutive periods, the $1^{st}$ AM group in the three AM groups is the first AM group, and the remaining two AM groups are the foregoing N AM groups, that is, N=2 in this case. In each sequence of 24 bits, the first 8 bits identify the "start of a remote defect sequence", and the subsequent 16 bits respectively represent a remote defect status of the 16 FECLs or PCSLs in sequence, where "1" indicates that a remote defect occurs, and "0" indicates that there is no fault.

It should be noted that the foregoing cases (a), (b), (c), and (d) are merely examples for description, and provided that the relationship between the first indication information and the N AM groups satisfies L·R=N·P·Q, the first indication information may be carried in the padding bit or the unique padding bit or the reserved bit of the status field of the AMGL information as required, or the first indication information may be carried in other bits of the AMGL information. This is not limited in this embodiment of this application.

It should also be noted that, to reduce signaling overheads, one bit is used to indicate a fault status of a receiving logical lane. In practical applications, a plurality of bits may be used to indicate a fault status of a receiving logical lane. This is not limited in this embodiment of this application.

A relationship between values of R and M is described in five cases as follows.

Case 1: If R is equal to M, the first indication information included in the N AM groups sent over the M transmitting logical lanes is used to indicate a fault status of receiving logical lanes with the same quantity as the transmitting logical lanes. According to the method 100, the first indication information is sent for the first time to indicate the fault status of the R receiving logical lanes for the first time. For example, R=M=8, when the first indication information in the N AM groups is sent for the first time, if a value of the first indication information is 00110000 corresponding to a fault status of eight receiving logical lanes, where "0" indicates that a receiving logical lane is not faulty, and "1" indicates that a receiving logical lane is faulty, the second device can determine, based on the first indication information, that the third and the fourth receiving logical lanes (the first receiving logical lane corresponds to the first bit value in 00110000 from left to right, the second receiving logical lane corresponds to the second bit value in 00110000 from left to right, . . . , and the eighth receiving logical lane corresponds to the eighth bit value in 00110000 from left to right) of the first device are faulty.

Case 2: If R is equal to M, and the M receiving logical lanes are all previously indicated as non-faulty, during a next indication, the first indication information is still used to indicate the fault status of the R receiving logical lanes. For example, R=M=8, during a previous indication, a value of the first indication information is 00000000, and the second device determines, based on the first indication information, that none of the eight receiving logical lanes are faulty. During a current indication, if a value of the first indication information is 00110000, where "0" indicates that a receiving logical lane is not faulty, and "1" indicates that a receiving logical lane is faulty, the second device can determine, based on the first indication information, that the third and the fourth receiving logical lanes (the first receiving logical lane corresponds to the first bit value in 00110000 from left to right, the second receiving logical lane corresponds to the second bit value in 00110000 from left to right, . . . , and the eighth receiving logical lane corresponds to the eighth bit value in 00110000 from left to right) of the first device are faulty this time.

Case 3: If R is equal to M, the first indication information indicates the fault status of the R receiving logical lanes in any process of indicating the fault status. Even if there are receiving logical lanes that are indicated as faulty last time and that have been processed or have not been processed in these R receiving logical lanes. If a value of the first indication information is 00110000, where "0" indicates that a receiving logical lane is not faulty, and "1" indicates that a receiving logical lane is faulty, the second device can determine, based on the first indication information, that the third and the fourth transmitting logical lanes (the first receiving logical lane corresponds to the first bit value in 00110000 from left to right, the second receiving logical lane corresponds to the second bit value in 00110000 from left to right, . . . , and the eighth receiving logical lane corresponds to the eighth bit value in 00110000 from left to right) of the first device are faulty. The third transmitting logical channel may be a logical channel that is faulty previously and is still in a faulty state, and the fourth transmitting logical channel may be a transmitting logical channel that is faulty this time.

Case 4: If R is less than M, and there may be M-R receiving logical lanes isolated, that is, in a non-working state due to a fault, when an indication is performed, there is no need to indicate a fault status of a receiving logical lane in an isolated state, but a fault status of only a receiving logical lane that has not been isolated needs to be indicated. For example, M=8, and R=6, indicating that there are already two faulty receiving logical lanes in the isolated state. During a current indication, the first indication message needs to indicate a fault status of only the six receiving logical lanes that have not been isolated, and a value of the first indication information is 110000, where "0" indicates that a receiving logical lane is not faulty, and "1" indicates that a receiving logical lane is faulty. That is, the second device can determine, based on the first indication information, that the first and the second receiving logical lanes (the first receiving logical lane corresponds to the first bit value in 110000 from left to right, the second receiving logical lane corresponds to the second bit value in 110000 from left to right, . . . , and the eighth receiving logical lane corresponds to the eighth bit value in 110000 from left to right) of the first device that are not isolated are faulty.

Case 5: If R is greater than M, the first indication information sent over transmitting logical lanes with a quantity less than that of receiving logical lanes may indicate a fault status of the transmitting logical lanes. For example, for the 200G Ethernet technology, R=8, and M=6. In this case, there are only six effective non-faulty transmitting logical lanes, and the first indication information needs to indicate a fault status of all the receiving logical lanes. A value of the first indication information is 00110000, where "0" indicates that a receiving logical lane is not faulty, and "1" indicates that a receiving logical lane is faulty. That is, the second device can determine, based on the first indication information, that the third and the fourth receiving logical lanes (the first receiving logical lane corresponds to the first bit value in 00110000 from left to right, the second receiving logical lane corresponds to the second bit value in 00110000 from left to right, . . . , and the eighth receiving logical lane corresponds to the eighth bit value in 00110000 from left to right) of the first device are faulty. During a next indication, if a fault of the third receiving logical lane of the first device disappears, and a fault of the fourth receiving logical lane still exists, a value of the first indication information sent by the first device to the second device is 00010000, and the second device can determine, based on the first indication information, that the fault of the third receiving logical lane of the first device disappears, and the fault of the fourth receiving logical lane still exists.

S130: The second device determines a faulty receiving logical lane from the R receiving logical lanes based on the first indication information.

Because a link has a bit error, to further improve the reliability of determining, the second device may determine a faulty receiving logical lane according to a majority rule, to be specific, a lane is determined as faulty only when a quantity of bits that mark the lane as faulty is more than a quantity of bits that mark the lane as normal. For example, for the 200G Ethernet technology, the first device transfers a "remote defect indication (remote defect indication, RDI)" by using 8 bits of $UP_0$ ($UP_1$ or $UP_2$) of each of the eight AMs in each period. Assuming that the first lane is faulty and the second to the eighth lanes work normally, a value of the first indication information transferred by using $UP_0$ of each AM of the first device is 10000000 (the first receiving logical lane corresponds to the first bit value in 10000000 from left to right, the second receiving logical lane corresponds to the second bit value in 10000000 from left to right, . . . , and the eighth lane corresponds to the eighth bit value in 10000000 from left to right). Due to the bit error, values of $UP_0$ of the eight AMs received by the second device are 10000000, 10000000, 00000000, 00000000, 10000000, 10000000, 00000000, and 10000000, respectively. Among the 8 bits that indicate a status of the first lane, 5 bits indicate that the lane is faulty, and 3 bits indicate that the lane is not faulty. The second device determines that the first lane is faulty according to the majority rule. For another example, for the 200G Ethernet technology, the first device transfers and sends a "remote defect indication" to the second device by using a sequence of 9 bits in total consisting of 1 bit in $UP_0$ ($UP_1$ or $UP_2$) of each of the eight AMs in eight pieces of AMGL information of each of the nine AM groups in nine consecutive periods, where the first bit identifies the "start of a remote defect sequence", and the subsequent 8 bits respectively represent a remote defect status of the eight FECLs or PCSLs in sequence, where "1" indicates that a remote defect occurs, and "0" indicates that there is no fault. Values of the sequence sent to the second device and consisting of 1 bit in $UP_0$ ($UP_1$ or $UP_2$) of each of the eight AMs in the eight pieces of AMGL information of each of the nine AM groups in the nine periods are 110000000, 110000000, 100000000, 100000000, 110000000, 110000000, 100000000, and 110000000, respectively (a value of the first bit being 1 indicates the start of the remote defect sequence, the second bit represents a status of the first receiving logical lane, the third bit represents a status of the second receiving logical lane, and by analogy, the ninth bit represents a status of the eighth receiving logical lane). Among the 8 bits that indicate a status of the first lane, 5 bits indicate that the lane is faulty, and 3 bits indicate that the lane is not faulty. The second device determines that the first lane is faulty according to the majority rule.

Alternatively, the second device may determine a faulty receiving logical lane according to an unanimity rule, that is, a lane is determined as faulty only when all bits that mark the lane indicate that the lane is faulty. For example, for the 200G Ethernet technology, the first device transfers a "remote defect indication (remote defect indication, RDI)" by using 8 bits of $UP_0$ ($UP_1$ or $UP_2$) of each of the eight AMs in each period. Assuming that the first lane is faulty and the second to the eighth lanes work normally, a value of the first indication information transferred by using $UP_0$ of each AM of the first device is 10000000 (the first receiving logical lane corresponds to the first bit value in 10000000 from left to right, the second receiving logical lane corresponds to the second bit value in 10000000 from left to right, . . . , and the eighth lane corresponds to the eighth bit value in 10000000 from left to right). Due to the bit error, values of $UP_0$ of the eight AMs received by the second device are 10000000, 10000000, 10000000, 10000000, 10000000, 10000000, 10000000, and 10000000, respectively. The 8 bits that indicate a status of the first lane all indicate that the lane is faulty. The second device determines that the first lane is faulty according to the unanimity rule. For another example, for the 200G Ethernet technology, the first device transfers and sends a "remote defect indication" to the second device by using a sequence of 9 bits in total consisting of 1 bit in $UP_0$ ($UP_1$ or $UP_2$) of each of the eight AMs in eight pieces of AMGL information of each of the nine AM groups in nine consecutive periods, where the first bit identifies the "start of a remote defect sequence", and the subsequent 8 bits respectively represent a remote defect status of the eight FECLs or PCSLs in sequence, where "1" indicates that a remote defect occurs, and "0" indicates that there is no fault. Values of the sequence sent to the second device and consisting of 1 bit in $UP_0$ ($UP_1$ or $UP_2$) of each of the eight AMs in the eight pieces of AMGL information of each of the nine AM groups in the nine periods are 110000000, 110000000, 110000000, 110000000, 110000000, 110000000, 110000000, and 110000000, respectively (a value of the first bit being 1 indicates the start of the remote defect sequence, the second bit represents a status of the first receiving logical lane, the third bit represents a status of the second receiving logical lane, and by analogy, the ninth bit represents a status of the eighth receiving logical lane). All the 8 bits that indicate a status of the first lane indicate that the lane is faulty. The second device determines that the first lane is faulty according to the unanimity rule.

To further improve the reliability, the second device may also determine a faulty receiving logical lane by using a method of determining in a plurality of consecutive periods. For example, for the 200G Ethernet technology, the first device transfers a "remote defect indication" (RDI) by using 8 bits of $UP_0$ ($UP_1$ or $UP_2$) of each of the eight AMs in each period. The second device determines a faulty receiving logical lane according to the majority rule. Only when it is determined that a receiving logical lane is faulty for N (which is an integer value greater than 1) consecutive AM periods, the second device determines that the receiving logical lane is faulty. For another example, for the 200G Ethernet technology, the first device transfers and sends a "remote defect indication" to the second device by using a sequence of 9 bits in total consisting of 1 bit in $UP_0$ ($UP_1$ or $UP_2$) of each of the eight AMs in eight pieces of AMGL information of each of the nine AM groups in nine consecutive periods, where the first bit identifies the "start of a remote defect sequence", and the subsequent 8 bits respectively represent a remote defect status of the eight FECLs or PCSLs in sequence, where "1" indicates that a remote defect occurs, and "0" indicates that there is no fault. The second device determines a faulty receiving logical lane according to the unanimity rule. Only when it is determined that a receiving logical lane is faulty for N consecutive rounds (N is an integer value greater than 1, and each round is nine AM periods), the second device determines that the receiving logical lane is faulty.

Optionally, the method 100 further includes: handling, by the first device, a faulty receiving logical lane in the R receiving logical lanes. After S130, the second device handles a transmitting logical lane corresponding to the faulty receiving logical lane of the first device. In other words, if a receiving logical lane of the first device is faulty, a transmitting logical lane of the second device over which data is sent to the receiving logical lane of the first device may also be considered as faulty and also needs to be handled, that is, all the logical lanes of the first device and the second device need to be handled at both the transmitter and receiver ends. For example, the handling includes isolation, disconnection, or the like. Optionally, after the first device handles the faulty receiving logical lane and the second device handles the transmitting logical lane corresponding to the faulty receiving logical lane of the first device, it can be detected, for example, through manual lane detection, that the fault disappears. After it is detected that the fault disappears, the first device and the second device are notified, that is, the first device and the second device are notified that the receiving and transmitting logical lanes have recovered from the fault. For another example, the second device inserts a specified pseudo-random sequence into the transmitting logical lane corresponding to the faulty receiving logical lane of the first device. After the first device can detect the specific pseudo-random sequence on the faulty receiving logical lane, it can be considered that the fault of the receiving and transmitting logical lanes disappears.

For example, for the 200G Ethernet technology, the second device has eight transmitting logical lanes, and the first device has eight receiving logical lanes corresponding to the eight transmitting logical lanes of the second device. When the first device determines the second receiving logical lane in the eight receiving logical lanes is faulty, a value of the first indication information sent to the second device is 01000000. After the second device obtains the first indication information, the second device determines its own second transmitting logical lane corresponding to the second receiving logical lane of the first device as a faulty transmitting logical lane. In other words, the second device does not send data over the second transmitting logical lane, and the first device does not receive data over the second receiving logical lane, either. The first device and the second device receive and send data over the remaining receiving and transmitting logical lanes. After a fault of the second receiving logical lane disappears, the third receiving logical lane becomes faulty. In this case, a value of the first indication information sent by the first device to the second device is 00100000. After the second device obtains the first indication information, the second device determines its own third transmitting logical lane corresponding to the third receiving logical lane of the first device as a faulty transmitting logical lane. In other words, the second device does not send data over the third transmitting logical lane, and the first device does not receive data over the third receiving logical lane, either. The first device and the second device receive and send data over the remaining receiving and transmitting logical lanes.

The method for indicating a fault status according to the embodiments of this application is described above in detail with reference to FIG. 1 to FIG. 6, and an apparatus for indicating a fault status according to the embodiments of this application is described below in detail with reference to FIG. 7 to FIG. 9.

Figure 7:
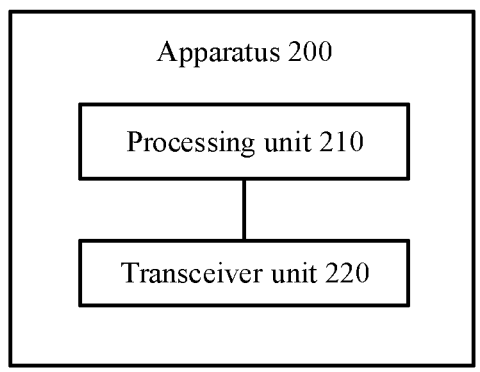
FIG. 7 is a schematic block diagram of an apparatus for indicating a fault status according to an embodiment of this application.

FIG. 7 is a schematic block diagram of an apparatus 200 for indicating a fault status according to an embodiment of this application. The apparatus 200 may correspond to a first device described in the foregoing method, or may correspond to a chip or component of the first device. In addition, each module or unit in the apparatus 200 may be configured to perform each action or processing process performed by the first device in the foregoing method. As shown in FIG. 7, the apparatus 200 for indicating a fault status may include a processing unit 210 and a transceiver unit 220.

The processing unit 210 is configured to determine N alignment marker AM groups, where the N AM groups include first indication information, the first indication information is used to indicate a fault status of R receiving logical lanes of the apparatus, and each of the N AM groups includes M pieces of alignment marker group lane AMGL information.

The transceiver unit 220 is configured to: in an $i^{th}$ period of N periods, respectively send M pieces of AMGL information constituting an $i^{th}$ AM group to a second device over M transmitting logical lanes, where the N periods are in a one-to-one correspondence with the N AM groups, and the N AM groups are used for the second device to align data sent by the apparatus over the M transmitting logical lanes in the N periods, where M, N, and R are positive integers, and i is a positive integer greater than 0 and less than or equal to N.

In an optional embodiment, Q pieces of AMGL information in the M pieces of AMGL information constituting each of the N AM groups include the first indication information, where L·R=N·P·Q, P is a quantity of bits of each of the Q pieces of AMGL information occupied by the first indication information, and L, P, and Q are positive integers.

In an optional embodiment, the transceiver unit 220 is further configured to:
before respectively sending the M pieces of AMGL information constituting the $i^{th}$ AM group to the second device over the M transmitting logical lanes, respectively send M pieces of AMGL information constituting a first AM group to the second device over the M transmitting logical lanes, where the first AM group includes second indication information, the second indication information is used to indicate that the N AM groups include the first indication information, the first indication information is carried in a first bit field of the Q pieces of AMGL information, and the second indication information is carried in the first bit field of at least some of the M pieces of AMGL information constituting the first AM group.

In an optional embodiment, L=1, P=1, Q=1, and the first indication information is carried in a reserved bit of a status field of the Q pieces of AMGL information.

In an optional embodiment, L=1, N=1, Q=1, and the first indication information is carried in a padding bit of the Q pieces of AMGL information.

In an optional embodiment, N=1, P=R, and the first indication information is carried in a padding bit of each of the Q pieces of AMGL information.

In an optional embodiment, R=N·P, and the first indication information is carried in a padding bit of each of the Q pieces of AMGL information.

In an optional embodiment, the padding bit is a unique padding bit.

In an optional embodiment, the transceiver unit 220 is specifically configured to: distribute the M pieces of AMGL information constituting the $i^{th}$ AM group to the M transmitting logical lanes; and send, over transmitting physical lanes corresponding to the M transmitting logical lanes, the M pieces of AMGL information constituting the $i^{th}$ AM group to receiving physical lanes of the second device.

In an optional embodiment, the M transmitting logical lanes and the R receiving logical lanes are physical coding sublayer lanes PCSLs or forward error correction lanes FECLs.

In an optional embodiment, first AMGL information in the M pieces of AMGL information includes a first alignment marker AM, second AMGL information in the M pieces of AMGL information includes a second AM and a padding bit, third AMGL information in the M pieces of AMGL information includes a third AM, a padding bit, and a status field bit, and the first AM, the second AM, and the third AM each include a unique padding bit; or
first AMGL information in the M pieces of AMGL information includes a fourth AM, and second AMGL information in the M pieces of AMGL information includes a fifth AM and a padding bit.

It should be understood that, for a specific process in which units in the apparatus 200 perform the foregoing corresponding steps, refer to descriptions in the foregoing method embodiments. For brevity, details are not described herein again.

Figure 8:
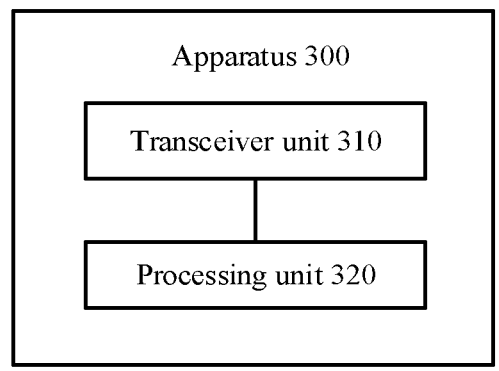
FIG. 8 is a schematic block diagram of another apparatus for indicating a fault status according to an embodiment of this application.

FIG. 8 is a schematic block diagram of an apparatus 300 for indicating a fault status according to an embodiment of this application. The apparatus 300 may correspond to a second device described in the foregoing method, or may correspond to a chip or component of the second device. In addition, each module or unit in the apparatus 300 may be configured to perform each action or processing process performed by the second device in the foregoing method. As shown in FIG. 8, the apparatus 300 for indicating a fault status may include a transceiver unit 310 and a processing unit 320.

The transceiver unit 310 is configured to: in an $i^{th}$ period of N periods, receive M pieces of AMGL information constituting an $i^{th}$ AM group and sent by a first device over M transmitting logical lanes, where N AM groups corresponding to the N periods include first indication information, the first indication information is used to indicate a fault status of R receiving logical lanes of the first device, each of the N AM groups includes M pieces of alignment marker group lane AMGL information, and the N AM groups are used for the second device to align data sent by the first device over the M transmitting logical lanes in the N periods.

The processing unit 320 is configured to determine a faulty receiving logical lane from the R receiving logical lanes based on the first indication information, where M, N, and R are positive integers, and i is a positive integer greater than 0 and less than or equal to N.

In an optional embodiment, Q pieces of AMGL information in the M pieces of AMGL information constituting each of the N AM groups include the first indication information, where L·R=N·P·Q, P is a quantity of bits of each of the Q pieces of AMGL information occupied by the first indication information, and L, P, and Q are positive integers.

In an optional embodiment, the transceiver unit 310 is further configured to: before receiving the M pieces of AMGL information constituting the $i^{th}$ AM group and sent by the first device over the M transmitting logical lanes, receive M pieces of AMGL information constituting a first AM group and respectively sent by the first device over the M transmitting logical lanes, where the first AM group includes second indication information, the second indication information is used to indicate that the N AM groups include the first indication information, the first indication information is carried in a first bit field of the Q pieces of AMGL information, and the second indication information is carried in the first bit field of at least some of the M pieces of AMGL information constituting the first AM group; and the processing unit 320 is specifically configured to: receive, based on the second indication information, the M pieces of AMGL information constituting the $i^{th}$ AM group and sent by the first device over the M transmitting logical lanes.

In an optional embodiment, L=1, P=1, Q=1, and the first indication information is carried in a reserved bit of a status field of the Q pieces of AMGL information; and the processing unit 320 is specifically configured to: determine the faulty receiving logical lane from the R receiving logical lanes based on the first indication information carried in the reserved bit of the status field of the Q pieces of AMGL information.

In an optional embodiment, L=1, N=1, Q=1, and the first indication information is carried in a padding bit of the Q pieces of AMGL information; and the processing unit 320 is specifically configured to: determine the faulty receiving logical lane from the R receiving logical lanes based on the first indication information carried in the padding bit of the Q pieces of AMGL information.

In an optional embodiment, N=1, P=R, and the first indication information is carried in a padding bit of each of the Q pieces of AMGL information; and the processing unit 320 is specifically configured to: determine the faulty receiving logical lane from the R receiving logical lanes based on the first indication information carried in the padding bit of each of the Q pieces of AMGL information.

In an optional embodiment, R=N·P, and the first indication information is carried in the padding bit of each of the Q pieces of AMGL information; and the processing unit 320 is specifically configured to: determine the faulty receiving logical lane from the R receiving logical lanes based on the first indication information carried in the padding bit of each of the Q pieces of AMGL information.

In an optional embodiment, the padding bit is a unique padding bit.

In an optional embodiment, the transceiver unit 310 is further configured to:

receive, over receiving physical lanes, the M pieces of AMGL information constituting the $i^{th}$ AM group and sent by the first device over physical lanes corresponding to the M transmitting logical lanes; and distribute the M pieces of AMGL information of the $i^{th}$ AM group to the M receiving logical lanes of the second device.

In an optional embodiment, the M transmitting logical lanes of the first device, the R receiving logical lanes of the first device, and the M receiving logical lanes of the apparatus are physical coding sublayer lanes PCSLs or forward error correction lanes FECLs.

In an optional embodiment, first AMGL information in the M pieces of AMGL information includes a first alignment marker AM, second AMGL information in the M pieces of AMGL information includes a second AM and a padding bit, third AMGL information in the M pieces of AMGL information includes a third AM, a padding bit, and a status field bit, and the first AM, the second AM, and the third AM each include a unique padding bit; or first AMGL information in the M pieces of AMGL information includes a fourth AM, and second AMGL information in the M pieces of AMGL information includes a fifth AM and a padding bit.

It should be understood that, for a specific process in which units in the apparatus 300 perform the foregoing corresponding steps, refer to descriptions in the foregoing method embodiments. For brevity, details are not described herein again.

The apparatus 200 in the foregoing solutions has functions of implementing corresponding steps performed by the first device in the foregoing method, and the apparatus 300 in the foregoing solutions has functions of implementing corresponding steps performed by the second device in the foregoing method. The functions may be implemented by hardware or software, or may be implemented by hardware executing corresponding software. The hardware or the software includes one or more modules corresponding to the foregoing functions. For example, the sending unit may be replaced with a communications interface, the receiving unit may be replaced with a communications interface, and another unit, for example, the determining unit, may be replaced with a processor, to separately perform a sending operation, a receiving operation, and a related processing operation in the method embodiments. In this embodiment of this application, a communications interface of an apparatus is used by the apparatus to communicate with another device. For example, the communications interface may be a transmitter, a receiver, a transceiver, a circuit, a bus, a module, a pin, or another type of communications interface. This is not limited in this embodiment of this application.

In a specific implementation process, the processor may be configured to perform, for example, but not limited to, baseband related processing, and the communications interface may be configured to perform, for example, but not limited to, information exchange. The foregoing components may be separately disposed on chips independent of each other, or at least some or all of the components may be disposed on one chip. For example, the processor may further be classified into an analog baseband processor and a digital baseband processor. The analog baseband processor and the communications interface may be integrated on a same chip, and the digital baseband processor may be disposed on an independent chip. With continuous development of integrated circuit technologies, an increasing quantity of components may be integrated on one chip. For example, the digital baseband processor and a plurality of application processors (for example, but not limited to a graphics processing unit and a multimedia processor) may be integrated into one chip. Such a chip may be referred to as a system on chip (SOC). Whether to separately dispose the components on different chips or integrate the components into one or more chips depends on a specific product design requirement. Specific implementations of the foregoing components are not limited in this embodiment of this application.

It may be understood that the processor in the foregoing embodiments may execute program instructions by using a hardware platform having a processor and a communications interface, to separately implement functions of the processor in any design in the foregoing embodiments of this application. Based on this, as shown in FIG. 9, an embodiment of this application provides a schematic block diagram of a data transmission apparatus 400. The apparatus 400 includes a processor 410, a communications interface 420, and a memory 430. The processor 410, the communications interface 420, and the memory 430 are coupled to communicate with each other. The memory 430 is configured to store instructions. The processor 410 is configured to execute the instructions stored in the memory 430, to control the communications interface 420 to send a signal and/or receive a signal. Coupling in this embodiment of this application may be indirect coupling or a communication connection between apparatuses, units, or modules in an electrical form, a mechanical form, or another form, and is used for information exchange between the apparatuses, the units, or the modules.

In a possible implementation, if the apparatus 400 is a first device, the processor 410 is configured to: determine N alignment marker AM groups, where the N AM groups include first indication information, the first indication information is used to indicate a fault status of R receiving logical lanes of the apparatus, and each of the N AM groups includes M pieces of alignment marker group lane AMGL information. The communications interface 420 is configured to: in an $i^{th}$ period of N periods, respectively send M pieces of AMGL information constituting an $i^{th}$ AM group to a second device over M transmitting logical lanes, where the N periods are in a one-to-one correspondence with the N AM groups, and the N AM groups are used for the second device to align data sent by the apparatus over the M transmitting logical lanes in the N periods, where M, N, and R are positive integers, and i is a positive integer greater than 0 and less than or equal to N.

In a possible implementation, if the apparatus 400 is a second device, the communications interface 420 is configured to: in an $i^{th}$ period of N periods, receive M pieces of AMGL information constituting an $i^{th}$ AM group and sent by a first device over M transmitting logical lanes, where N AM groups corresponding to the N periods include first indication information, the first indication information is used to indicate a fault status of R receiving logical lanes of the first device, each of the N AM groups includes M pieces of alignment marker group lane AMGL information, and the N AM groups are used for the second device to align data sent by the first device over the M transmitting logical lanes in the N periods. The processor 410 is configured to determine a faulty receiving logical lane from the R receiving logical lanes based on the first indication information, where M, N, and R are positive integers, and i is a positive integer greater than 0 and less than or equal to N.

Figure 9:
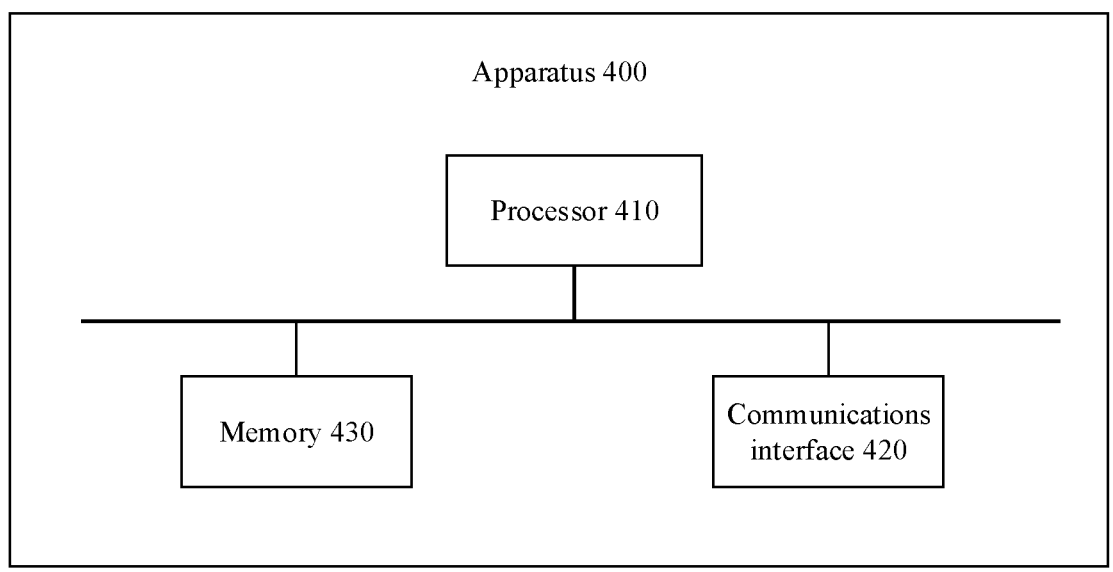
FIG. 9 is a schematic block diagram of still another apparatus for indicating a fault status according to an embodiment of this application.

It should be understood that the apparatus in FIG. 7 or the apparatus in FIG. 8 in this embodiment of this application may be implemented by using the apparatus 400 in FIG. 9, and may be configured to perform steps and/or procedures corresponding to the first device and the second device in the foregoing method embodiments.

It may be understood that the methods, the procedures, the operations, or the steps in the designs described in the embodiments of this application can be implemented in a one-to-one correspondence manner by using computer software, electronic hardware, or a combination of computer software and electronic hardware. Whether these functions are performed in a hardware manner or a software manner depends on specific application and a design constraint of the technical solutions. For example, in consideration of aspects such as good universality, low costs, and decoupling between software and hardware, these functions may be implemented by executing program instructions. For another example, in consideration of aspects such as system performance and reliability, these functions may be implemented by using a dedicated circuit. A person of ordinary skill in the art may implement the described functions by using different methods for each particular application. This is not limited herein.

According to the method provided in the embodiments of this application, this application further provides a computer program product. The computer program product includes computer program code. When the computer program code is run on a computer, the computer performs the method in the foregoing embodiments. The embodiments in this application may also be combined with each other.

According to the methods provided in the embodiments of this application, this application further provides a computer-readable medium. The computer-readable medium stores program code. When the program code is run on a computer, the computer is enabled to perform the methods in the foregoing embodiments.

In the embodiments of this application, it should be noted that the foregoing method embodiments in the embodiments of this application may be applied to a processor, or may be implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and logic block diagrams that are disclosed in the embodiments of this application may be implemented or performed. The general-purpose processor may be a microprocessor, any conventional processor, or the like.

It may be understood that the memory in the embodiments of this application may be a volatile memory or a nonvolatile memory, or may include a volatile memory and a nonvolatile memory. The non-volatile memory may be a read-only memory (read-only memory, ROM), a programmable read-only memory (PROM), an erasable programmable read-only memory (EPROM), an electrically erasable programmable read-only memory (EEPROM), or a flash memory. The volatile memory may be a random access memory RAM), and is used as an external cache. There are a plurality of different types of RAMs, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The terms "first", "second", and the like in this application are merely used to distinguish different objects, and "first" and "second" do not limit an actual sequence or functions of objects modified by "first" and "second". Any embodiment or design solution described as "example", "for example", "such as", "optionally", or "in some implementations" in this application should not be construed as being more preferred or more advantageous than another embodiment or design. Specifically, using these words is intended to present a related concept in detail.

Names may be assigned to various objects that may appear in this application, for example, various messages/information/devices/network elements/systems/apparatuses/operations. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

All or some of the foregoing embodiments may be implemented by using software, hardware, firmware, or any combination thereof. When software is used to implement the embodiments, the embodiments may be implemented completely or partially in a form of a computer program product. The computer program product may include one or more computer instructions. When the computer program instructions are loaded and executed on the computer, the procedure or functions according to the embodiments of this application are completely or partially generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD)), or the like.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for ease and brevity of description, for a detailed working process of the foregoing system, apparatus, and unit, refer to a corresponding process in the foregoing method embodiments. Details are not described herein again. In the embodiments of this application, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

In the several embodiments provided in this application, it should be understood that the disclosed system, apparatus, and method may be implemented in another manner. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for indicating a fault status, the method comprising:
   determining, by a first device, N alignment marker (AM) groups, wherein the N AM groups comprise first indication information, the first indication information indicating a fault status of R receiving logical lanes of the first device, each of the N AM groups including M pieces of alignment marker group lane (AMGL) information; and
   sending, by the first device in an $i^{th}$ period of N periods, respectively, M pieces of AMGL information constituting an $i^{th}$ AM group, to a second device over M transmitting logical lanes, the N periods being in a one-to-one correspondence with the N AM groups; and
   aligning, by the second device in accordance with the N AM groups, data sent by the first device over the M transmitting logical lanes in the N periods, wherein M, N, and R are positive integers, and i is a positive integer greater than 0 and less than or equal to N.

2. The method according to claim 1, wherein Q pieces of AMGL information in the M pieces of AMGL information constituting each of the N AM groups comprise the first indication information, the method comprising:
   respectively sending, by the first device, M pieces of AMGL information constituting a first AM group to the second device over the M transmitting logical lanes, wherein the first AM group comprises second indication information, the second indication information indicating that the N AM groups comprise the first indication information, the first indication information being carried in a first bit field of the Q pieces of AMGL information, and the second indication information being carried in a first bit field of at least some of the M pieces of AMGL information constituting the first AM group.

3. The method according to claim 1, wherein Q pieces of AMGL information in the M pieces of AMGL information constituting each of the N AM groups comprise the first indication information, wherein L·R=N·P·Q, P is a quantity of bits of each of the Q pieces of AMGL information occupied by the first indication information, and L, P, and Q are positive integers.

4. The method according to claim 3, wherein L=1, P=1, Q=1, and the first indication information is carried in a reserved bit of a status field of the Q pieces of AMGL information.

5. The method according to claim 3, wherein L=1, N=1, Q=1, and the first indication information is carried in a padding bit of the Q pieces of AMGL information.

6. The method according to claim 3, wherein N=1, P=R, and the first indication information is carried in a padding bit of each of the Q pieces of AMGL information.

7. The method according to claim 3, wherein R=N·P, and the first indication information is carried in a padding bit of each of the Q pieces of AMGL information.

8. The method according to claim 1, wherein
   first AMGL information in the M pieces of AMGL information comprises a first alignment marker, second AMGL information in the M pieces of AMGL information comprises a second AM and a padding bit, third AMGL information in the M pieces of AMGL information comprises a third AM, a padding bit, and a status field bit, and the first AM, the second AM, and the third AM each comprise a unique padding bit; or
   first AMGL information in the M pieces of AMGL information comprises a fourth AM, and second AMGL information in the M pieces of AMGL information comprises a fifth AM and a padding bit.

9. A method for indicating a fault status, comprising:
   receiving, by a second device in an $i^{th}$ period of N periods, M pieces of alignment marker group lane (AMGL) information constituting an $i^{th}$ alignment marker (AM) group and sent by a first device over M transmitting logical lanes, wherein N AM groups corresponding to the N periods comprise first indication information, the first indication information indicating a fault status of R receiving logical lanes of the first device, each of the N AM groups including M pieces of AMGL information; and
   aligning, by the second device in accordance with the N AM groups, data sent by the first device over the M transmitting logical lanes in the N periods; and
   determining, by the second device, a faulty receiving logical lane from the R receiving logical lanes based on the first indication information, wherein M, N, and R are positive integers, and i is a positive integer greater than 0 and less than or equal to N.

10. The method according to claim 9, wherein Q pieces of AMGL information in the M pieces of AMGL information constituting each of the N AM groups comprise the first indication information, the method comprising:
    receiving, by the second device, M pieces of AMGL information constituting a first AM group and respectively sent by the first device over the M transmitting logical lanes, the first AM group comprising second indication information, the second indication information indicating that the N AM groups comprise the first indication information, the first indication information being carried in a first bit field of the Q pieces of AMGL information, and the second indication information being carried in the first bit field of at least some of the M pieces of AMGL information constituting the first AM group; wherein
    the receiving, by the second device, M pieces of AMGL information constituting an $i^{th}$ AM group and sent by a first device over M transmitting logical lanes comprises:
    receiving, by the second device based on the second indication information, the M pieces of AMGL information constituting the $i^{th}$ AM group and sent by the first device over the M transmitting logical lanes.

11. The method according to claim 9, wherein Q pieces of AMGL information in the M pieces of AMGL information constituting each of the N AM groups comprise the first indication information, wherein L·R=N·P·Q, P is a quantity of bits of each of the Q pieces of AMGL information occupied by the first indication information, and L, P, and Q are positive integers.

12. The method according to claim 11, wherein L=1, P=1, Q=1, and the first indication information is carried in a reserved bit of a status field of the Q pieces of AMGL information, wherein
    the determining, by the second device, a faulty receiving logical lane from the R receiving logical lanes based on the first indication information comprises:
    determining, by the second device, the faulty receiving logical lane from the R receiving logical lanes based on the first indication information carried in the reserved bit of the status field of the Q pieces of AMGL information.

13. The method according to claim 11, wherein L=1, N=1, Q=1, and the first indication information is carried in a padding bit of the Q pieces of AMGL information, wherein
the determining, by the second device, a faulty receiving logical lane from the R receiving logical lanes based on the first indication information comprises:
determining, by the second device, the faulty receiving logical lane from the R receiving logical lanes based on the first indication information carried in the padding bit of the Q pieces of AMGL information.

14. An apparatus for indicating a fault status, comprising:
one or more processors; and
a non-transitory computer-readable memory storing a program to be executed by the one or more processors, the program including instructions that, when executed by the one or more processors, cause the apparatus to:
determine N alignment marker (AM) groups, wherein the N AM groups comprise first indication information, the first indication information indicating a fault status of R receiving logical lanes of the apparatus, each of the N AM groups including M pieces of alignment marker group lane (AMGL) information; and
send, to a second device over M transmitting logical lanes in an $i^{th}$ period of N periods, M pieces of AMGL information constituting an $i^{th}$ AM group, wherein the N periods are in a one-to-one correspondence with the N AM groups; and
align, by the second device using the N AM groups, data sent by the apparatus over the M transmitting logical lanes in the N periods, wherein M, N, and R are positive integers, and i is a positive integer greater than 0 and less than or equal to N.

15. The apparatus according to claim 14, wherein Q pieces of AMGL information in the M pieces of AMGL information constituting each of the N AM groups comprise the first indication information, the instructions, when executed by the one or more processors, cause the apparatus to:
before respectively sending the M pieces of AMGL information constituting the $i^{th}$ AM group to the second device over the M transmitting logical lanes, respectively send M pieces of AMGL information constituting a first AM group to the second device over the M transmitting logical lanes, wherein the first AM group comprises second indication information, the second indication information is used to indicate that the N AM groups comprise the first indication information, the first indication information is carried in a first bit field of the Q pieces of AMGL information, and the second indication information is carried in the first bit field of at least some of the M pieces of AMGL information constituting the first AM group.

16. The apparatus according to claim 14, wherein Q pieces of AMGL information in the M pieces of AMGL information constituting each of the N AM groups comprise the first indication information, wherein L·R=N·P·Q, P is a quantity of bits of each of the Q pieces of AMGL information occupied by the first indication information, and L, P, and Q are positive integers.

17. The apparatus according to claim 16, wherein L=1, P=1, Q=1, and the first indication information is carried in a reserved bit of a status field of the Q pieces of AMGL information.

18. The apparatus according to claim 16, wherein L=1, N=1, Q=1, and the first indication information is carried in a padding bit of the Q pieces of AMGL information.

19. The apparatus according to claim 16, wherein N=1, P=R, or R=N·P, and the first indication information is carried in a padding bit of each of the Q pieces of AMGL information.

20. The apparatus according to claim 14, wherein
first AMGL information in the M pieces of AMGL information comprises a first alignment marker AM, second AMGL information in the M pieces of AMGL information comprises a second AM and a padding bit, third AMGL information in the M pieces of AMGL information comprises a third AM, a padding bit, and a status field bit, and the first AM, the second AM, and the third AM each comprise a unique padding bit; or
first AMGL information in the M pieces of AMGL information comprises a fourth AM, and second AMGL information in the M pieces of AMGL information comprises a fifth AM and a padding bit.

* * * * *